United States Patent
Wu et al.

(10) Patent No.: US 10,936,658 B2
(45) Date of Patent: Mar. 2, 2021

(54) GRAPH ANALYTICS USING RANDOM GRAPH EMBEDDING

(71) Applicant: International Business Machines Corporation, Armonk, NY (US)

(72) Inventors: Lingfei Wu, Elmsford, NY (US); Kun Xu, Bellevue, WA (US); Wei Zhang, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 16/146,700

(22) Filed: Sep. 28, 2018

(65) Prior Publication Data

US 2020/0104426 A1    Apr. 2, 2020

(51) Int. Cl.
| | |
|---|---|
| G06F 16/00 | (2019.01) |
| G06F 16/901 | (2019.01) |
| G06F 17/16 | (2006.01) |
| G06N 20/00 | (2019.01) |

(52) U.S. Cl.
CPC .......... *G06F 16/9024* (2019.01); *G06F 17/16* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,244,662 | B2 | 8/2012 | Coury et al. |
| 9,147,273 | B1 | 9/2015 | Allen et al. |
| 2008/0118124 | A1 | 5/2008 | Madabhushi et al. |
| 2009/0324107 | A1 | 12/2009 | Walch |
| 2010/0121792 | A1* | 5/2010 | Yang .............. G06F 16/9024 706/12 |
| 2011/0210973 | A1 | 9/2011 | Di Crescenzo et al. |
| 2013/0097138 | A1* | 4/2013 | Barkol ............ G06F 16/24544 707/706 |
| 2014/0278517 | A1 | 9/2014 | Patel et al. |
| 2017/0199905 | A1* | 7/2017 | Ott .................... G06F 16/9024 |
| 2017/0316082 | A1 | 11/2017 | McQueary et al. |
| 2018/0032587 | A1 | 2/2018 | Abdelhamid et al. |
| 2018/0160281 | A1* | 6/2018 | Zweig ................ G06F 17/16 |

OTHER PUBLICATIONS

Atwood, et al., Sparse diffusion-convolutional neural networks. In 31st Conference on Neural Information Processing Systems, Oct. 26, 2017, 7 Pages.

Bach, On the Equivalence between Kernel Quadrature Rules and Random Feature Expansions, Journal of Machine Learning Research 18, Apr. 2017, 38 Pages.

(Continued)

*Primary Examiner* — Son T Hoang

(74) *Attorney, Agent, or Firm* — Amin, Turocy & Watson, LLP

(57) ABSTRACT

Systems, computer-implemented methods, and computer program products that facilitate task-dependent analysis of various types of data graphs, based at least on generation of a random graph based on node embeddings corresponding to a data graph, and computation of a graph feature matrix corresponding to the data graph based on a distance between the random graph and the data graph.

18 Claims, 12 Drawing Sheets

(56) References Cited

OTHER PUBLICATIONS

Bleik, et al., Text Categorization of Biomedical Data Sets Using Graph Kernels and a Controlled Vocabulary, IEEE Transactions on Computational Biology and Bioinformatics, 2013, 8 Pages.
Borgwardt, et al., Shortest-path kernels on graphs, Proceedings of 5th IEEE Int. Conf. on Data Mining, 2005, 8 Pages.
Bourgeois, et al., An Extension of the Munkres Algorithm for the Assignment Problem to Rectangular Matrices, Communications of the ACM, Dec. 1971, pp. 802-804, vol. 14, No. 12.
Fan, et al., Liblinear: A library for large linear classification, Journal of machine learning research, Aug. 2008, pp. 1871-1874.
Gartner, et al., On graph kernels: Hardness results and efficient alternatives, In Learning Theory and Kernel Machines, 2003, pp. 129-143.
Haussler, Convolution kernels on discrete structures, Jul. 8, 1999, 38 Pages.
Hitchcock, The distribution of a product from several sources to numerous localities, Studies in Applied Mathematics, 1941, pp. 224-230.
Ionescu, et al., Large-scale data-dependent kernel approximation, In Proceedings of the 20th International Conference on Artificial Intelligence and Statistics, 2017, 9 Pages, vol. 54.
Johansson, et al., Learning with Similarity Functions on Graphs using Matchings of Geometric Embeddings, Knowledge Discovery and Data Mining, Aug. 13, 2015, pp. 467-476.
Johansson, et al., Global Graph Kernels using Geometric Embeddings, In Proceedings of the 31st International Conference on Machine Learning, 2014, 9 Pages, vol. 32.
Kondor, et al., The Multiscale Laplacian Graph Kernel, In 30th Conference on Neural Information Processing Systems, 2016, 9 Pages.
Kriege, et al., On Valid optimal Assignment Kernels and Applications to Graph Classification, 30th Conference on Neural information Processing Systems, 2016, 9 Pages.
Kusner, et al., From Word Embeddings to Document Distances. In Proceedings of the 32nd International Conference on Machine Learning, 2015, 10 Pages, vol. 37.
Lovasz, On the Shannon capacity of a graph, IEEE Transactions on Information Theory, Feb. 1979, 8 Pages.
Mokhtari, et al., Decoding brain states using backward edge elimination and graph kernels in fMRI connectivity networks, Journal of Neuroscience Methods, Oct. 25, 2012, pp. 259-268, vol. 212.
Niepert, et al., Learning Convolutional Neural Networks for Graphs, In Proceedings of the 33rd International Conference on Machine Learning, Jun. 8, 2016, 10 Pages.
Nikolentzos, et al., Matching Node Embeddings for Graph Similarity, Proceedings of the 31st AAAI Conference on Artificial Intelligence, 2017, 7 Pages.
Rahimi, et al., Random Features for Large-Scale Kernel Machines, 2008, 8 Pages.
Ralaivola, et al., Graph kernels for chemical informatics, Neural Networks, 2005, pp. 1093-1110, vol. 18.
Rubner, et al., The Earth Mover's Distance as a Metric for Image Retrieval, 2000, 20 Pages.
Rudi, et al., Generalization properties of learning with random features, In 31st Conference on Neural information Processing Systems, 2017, 11 Pages.
Shervashidze, et al., Fast subtree kernels on graphs, 2009, 9 Pages.
Shervashidze, et al., Efficient graphlet kernels for large graph comparison, In Proceedings of the 12th International Conference on Artificial Intelligence and Statistics, 2009, pp. 488-495, vol. 5.
Shervashidze, et al., Weisfeiler-Lehman Graph Kernels, Journal of Machine Learning Research, Sep. 2011, pp. 2539-2561, vol. 12.
Sinha, et al., Learning Kernels with Random Features, 30th Conference on Neural information Processing Systems, 2016, 20 Pages.
Solomon, et al., Continuous-Flow Graph Transportation Distances, Mar. 22, 2016, 11 Pages.
Stathopoulos, et al., Primme: Preconditioned Iterative Multimethod Eigensolver: Methods and software description, ACM Transactions on Mathematical Software, 2010, 29 Pages.
Vishwanathan, et al., Graph kernels, Journal of Machine Learning Research, Apr. 2010, pp. 1201-1242, vol. 11.
Von Luxburg, A Tutorial on Spectral Clustering, Statistics and Computing, 2007, 32 Pages, vol. 17, No. 4.
Wu, et al., DGCNN: Disordered Graph Convolutional Neural Network Based on the Gaussian Mixture Model, Dec. 10, 2017, 14 Pages.
Wu, et al., D2KE: From Distance to Kernel and Embedding, May 25, 2018, 15 Pages.
Wu, et al., Random Warping Series: A Random Features Method for Time-Series Embedding. In Proceedings of the 21st International Conference on Artificial Intelligence and Statistics, 2018, 10 Pages, vol. 84.
Wu, et al., Primme_SVDS: A High-Performance Preconditioned SVD Solver for Accurate Large-Scale Computations, Jan. 24, 2017, 24 Pages.
Yanardag, et al., Deep Graph Kernels. In Proceedings of the 15th KDD International Conference on Knowledge Discovery and Data Mining, Aug. 13, 2015, 10 Pages.
Yanardag, et al., A Structural Smoothing Framework for Robust Graph-Comparison, 2015, 9 Pages.
Zhang, et al., An End-to-End Deep Learning Architecture for Graph Classification, 2018, 8 Pages.
Wei, et al., Graph embedding based feature selection, Neurocomputing, May 17, 2012, pp. 115-125, vol. 93.
Nikolentzos, et al., Kernel Graph Convolutional Neural Networks, Oct. 29, 2017, 10 Pages.
Hamilton, et al., Representation Learning on Graphs: Methods and Applications, Apr. 10, 2018, 24 Pages.
Narayanan, et al., Subgraph2vec: Learning Distributed Representations of Rooted Sub-graphs from Large Graphs, Jun. 29, 2016, 8 Pages.
Mel, et al., The NIST Definition of Cloud Computing, National Institute of Standards and Technology Special Publication 800-145, Sep. 2011, 7 Pages.

* cited by examiner

Algorithm 300: Random Graph Embedding

Input: Data graphs $\{G_i\}_{i=1}^N$, node embedding size $d$, maximum size of random graphs $D_{max}$, graph embedding size $R$.

Output: Feature matrix $Z_{N \times R}$ for data graphs

1: Compute nBOW weights vectors $\{t(G_i)\}_{i=1}^N$ of the normalized Laplacian $L$ of all graphs
2: Obtain node embedding vectors $\{u_i\}_{i=1}^n$ by computing $l$ smallest eigenvectors of $L$
3: for $j = 1, \ldots, R$ do
4:    Draw $D_j$ uniformly from $[1, D_{max}]$.
5:    Generate a random graph $G_{\omega_j}$ with $D_j$ number of nodes embeddings $W$ from Algorithm 400.
6:    Compute a feature vector $Z_j = \phi_{G_{\omega_j}}(\{G_i\}_{i=1}^N))$ using EMD or other distance in Equation (2).
7: end for
8: Return feature matrix $Z(\{G_i\}_{i=1}^N) = \frac{1}{\sqrt{R}}\{Z_j\}_{j=1}^R$

FIG. 3

Algorithm 400: Random Graph Generation

Input: Node embeddings $U = \{u_i\}_{i=1}^N$, node embedding size $d$, size of random graph $D_j$.
Output: Random node embeddings $W = \{w_i\}_{i=1}^{D_j}$.
1: if Choose RGE(RF) then
2:     Compute maximum value $u_{max}$ and minimum value $u_{min}$ in $U$.
3:     Generate a number $D_j$ of random node embedding vectors $\{w_i\}_{i=1}^{D_j}$ in a random graph drawn from $(u_{min} + (u_{max} - u_{min}) \times rand(d, D_j))$.
4: else if Choose RGE(ASG) then
5:     Uniformly draw graph index $k = rand(1, N)$ and select the $k$-th raw graph
6:     Uniformly draw a number $D_j$ of node indices $(n_1, n_2, \ldots, n_{D_j})$ in the $k$-th raw graph
7:     Generate a number $D_j$ of random node embedding vectors $\{w_i\}_{i=1}^{D_j} = \{u_{n_1}, u_{n_2}, \ldots, u_{n_{D_j}}\}$ as well as its associated node labels for a random graph
8: end if
9: Return $W = \{w_i\}_{i=1}^{D_j}$ for a random graph

FIG. 4

GRAPH ANALYTICS USING RANDOM GRAPH EMBEDDING

BACKGROUND

The subject disclosure relates to data analytics systems, and more specifically, to data graph similarity analytics based on graph embedding.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate random graph embedding components are described.

According to an embodiment, a system can comprise a memory that stores computer executable components and a processor that executes the computer executable components stored in the memory. The computer executable components can comprise a random graph component that can generate a random graph based on node embeddings corresponding to a data graph. The computer executable components can further comprise a graph embedding component that can compute a graph feature matrix corresponding to the data graph based on a distance between the random graph and the data graph.

According to another embodiment, a computer-implemented method can comprise generating, by a system operatively coupled to a processor, a random graph based on node embeddings corresponding to a data graph. The computer-implemented method can further comprise computing, by the system, a graph feature matrix corresponding to the data graph based on a distance between the random graph and the data graph.

According to another embodiment, a computer program product that can facilitate graph similarity analytics is provided. The computer program product can comprise a computer readable storage medium having program instructions embodied therewith, the program instructions can be executable by a processing component to cause the processing component to generate, by the processor, a random graph based on node embeddings corresponding to a data graph. The program instructions can also cause the processing component to compute, by the processor, a graph feature matrix corresponding to the data graph based on a distance between the random graph and the data graph.

DESCRIPTION OF THE DRAWINGS

FIG. 3 illustrates an example, non-limiting algorithm that facilitates random graph embedding components in accordance with one or more embodiments described herein.

FIG. 4 illustrates an example, non-limiting algorithm that facilitates random graph embedding components in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
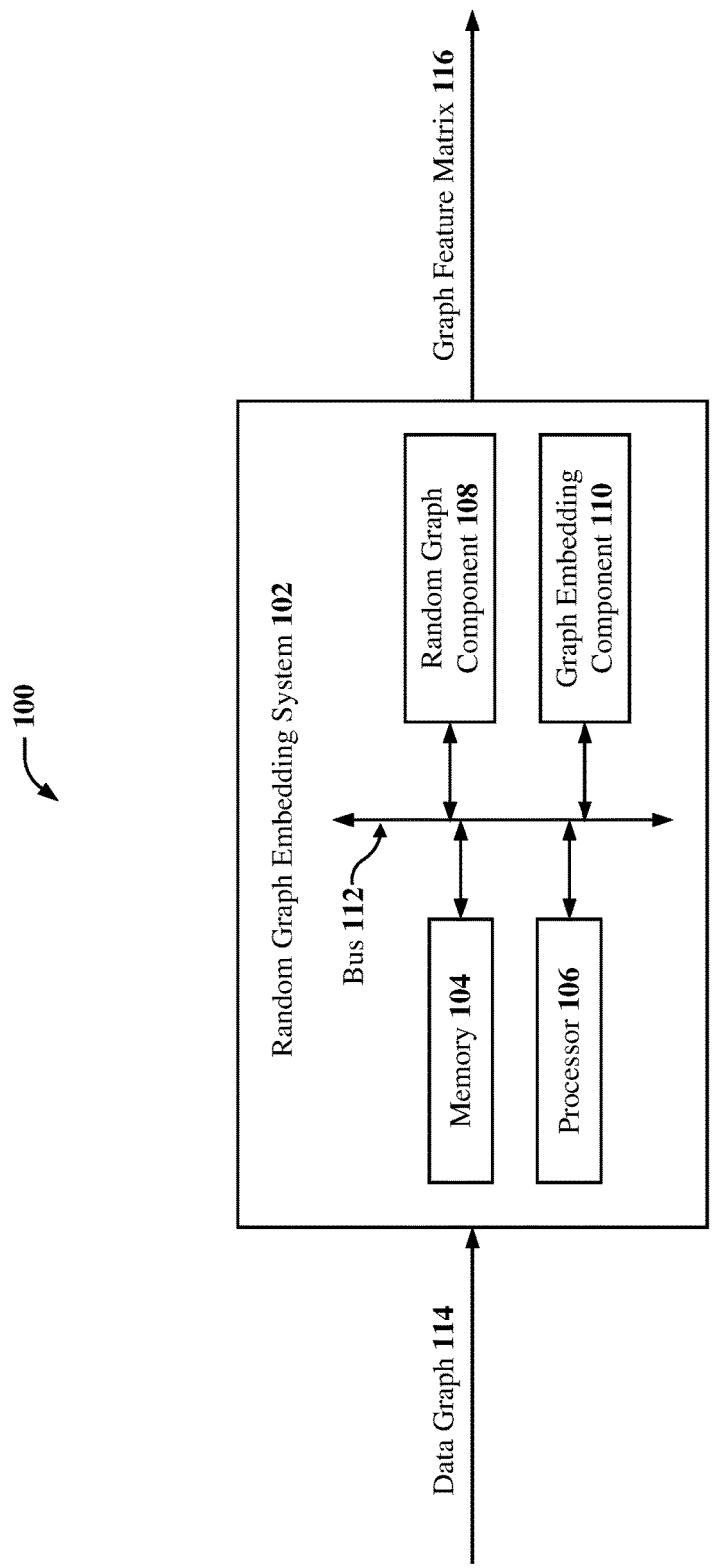
FIG. 1 illustrates a block diagram of an example, non-limiting system that facilitates random graph embedding components in accordance with one or more embodiments described herein.

FIG. 1 illustrates a block diagram of an example, non-limiting system 100 that facilitates random graph embedding components in accordance with one or more embodiments described herein. In some embodiments, system 100 can be associated with a cloud computing environment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, system 100 can comprise a random graph embedding system 102. In some embodiments, random graph embedding system 102 can comprise a memory 104, a processor 106, a random graph component 108, a graph embedding component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or random graph embedding system 102 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to random graph embedding system 102, random graph component 108, graph embedding component 110, and/or another component associated with random graph embedding system 102, as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor.

In some embodiments, random graph embedding system 102, memory 104, processor 106, random graph component 108, graph embedding component 110, and/or another component of random graph embedding system 102 as described herein can be communicatively, electrically, and/or operatively coupled to one another via bus 112 to perform functions of system 100, random graph embedding system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 1018 and FIG. 10. Such examples of bus 112 can be employed to implement any embodiments of the subject disclosure.

In some embodiments, random graph embedding system 102 can comprise any type of component, machine, device, facility, apparatus, and/or instrument that comprises a processor and/or can be capable of effective and/or operative communication with a wired and/or wireless network. All such embodiments are envisioned. For example, random graph embedding system 102 can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, random graph embedding system 102 can be coupled (e.g., communicatively, electrically, operatively, etc.) to one or more external systems, sources, and/or devices (e.g., computing devices, etc.) via a data cable (e.g., High-Definition Multimedia Interface (HDMI), recommended standard (RS) 232, Ethernet cable, etc.). In some embodiments, random graph embedding system 102 can be coupled (e.g., communicatively, electrically, operatively, etc.) to one or more external systems, sources, and/or devices (e.g., computing devices, etc.) via a network.

According to multiple embodiments, such a network can comprise wired and wireless networks, including, but not limited to, a cellular network, a wide area network (WAN) (e.g., the Internet) or a local area network (LAN). For example, random graph embedding system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, random graph embedding system 102 can thus include hardware (e.g., a central processing unit (CPU), a transceiver, a decoder), software (e.g., a set of threads, a set of processes, software in execution) or a combination of hardware and software that facilitates communicating information between random graph embedding system 102 and external systems, sources, and/or devices (e.g., computing devices, etc.).

According to multiple embodiments, random graph embedding system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with random graph embedding system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, random graph component 108, graph embedding component 110, and/or any other components associated with random graph embedding system 102 as disclosed herein (e.g., communicatively, electronically, and/or operatively coupled with and/or employed by random graph embedding system 102), can comprise such computer and/or machine readable, writable, and/or executable component(s) and/or instruction(s). Consequently, according to numerous embodiments, random graph embedding system 102 and/or any components associated therewith as disclosed herein, can employ processor 106 to execute such computer and/or machine readable, writable, and/or executable component(s) and/or instruction(s) to facilitate performance of one or more operations described herein with reference to random graph embedding system 102 and/or any such components associated therewith.

In some embodiments, random graph embedding system 102 and/or components thereof (e.g., random graph component 108, graph embedding component 110, etc.), can facilitate task-dependent analysis of various types of data graphs. For example, as described in detail below with reference to the disclosed figures, random graph embedding system 102 and/or components thereof, can facilitate task-dependent analysis of data graphs associated with, for instance: disease classification based on brain activities; road congestion prediction based on traffic flows; online anomaly detection in online social networks; spatial-temporal analysis in biological samples; graph pattern matching and searching; and/or another type of data graph.

As referenced herein, a graph and/or a data graph can constitute a representation of one or more relationships among inter-related data. For example, a graph can constitute a representation of one or more relationships among data samples, a digital version of a brain network, an online social network, a distributed system, and/or a representation of another relationship among inter-related data. In some embodiments, a graph and/or a data graph can constitute a data structure (e.g., a graph-structured dataset) that can represent data as a network of nodes (e.g., vertices), where a relationship between the nodes can be represented as connections (e.g., edges).

In some embodiments, graph similarity among numerous graphs can be determined to facilitate analytics for a technological system associated with numerous graphs. For example, a graph can be converted into a vector representation to facilitate determination of similarity among a graph and another graph that is converted into another vector representation. However, quantifying a similarity between graphs represented as vectors is generally difficult and/or computationally expensive (e.g., requiring substantial amount of resource capacity such as, for example, processing capacity, memory capacity, time, etc.). Furthermore, graphs represented as vectors generally cannot be employed for different graph tasks.

In some embodiments, to address the issues described above and/or other issues, random graph embedding system 102 and/or components thereof (e.g., random graph component 108, graph embedding component 110, etc.), can implement one or more graph kernels. For example, random graph embedding system 102 and/or components thereof, can implement one or more global graph kernels that can comprise global properties of one or more graphs (e.g., data graphs) by employing geometric node embeddings techniques and/or associated node transportation techniques (e.g., as described below with reference to random graph component 108 and/or graph embedding component 110). In some embodiments, random graph embedding system 102 and/or components thereof, can implement one or more global graph kernels comprising positive-definite (PD) kernels constructed from a random feature map given by a transportation distance between a set of geometric node embeddings of raw graphs and those of a distribution over random graphs (e.g., as described below with reference to random graph component 108 and/or graph embedding component 110).

As referenced herein, a graph kernel can constitute a function corresponding to a high dimensional feature space that can provide a flexible technique to represent one or more graphs and/or compute similarities between such graphs. As referenced herein, embedding can constitute a topological graph technique of drawing a representation of a graph on a surface (e.g., a surface in a two-dimensional space, three-dimensional space, etc.), where points on the surface can constitute nodes (e.g., vertices) and arcs on the surface can constitute relationships (e.g., edges) between the nodes. In some embodiments, embedding can comprise drawing a graph on a surface such that: endpoints of an arc constitute end vertices; arcs do not include points associated with other vertices; and two arcs do not intersect at a point that is interior to either arc. For example, embedding of a graph can comprise drawing the graph on the surface such that edges intersect only at their endpoints. In some embodiments, a planar graph can be embedded in a two-dimensional (2D) Euclidian space and a finite graph can be embedded in a three-dimensional (3D) Euclidian space.

In some embodiments, to implement one or more global graph kernels (e.g., positive-definite (PD) global graph kernels described above), random graph embedding system 102 can facilitate performance of operations executed by and/or associated with random graph component 108, graph embedding component 110, and/or another component associated with random graph embedding system 102 as disclosed herein. For example, as described in detail below, random graph embedding system 102 can facilitate: generating a random graph based on node embeddings corresponding to a data graph; computing a graph feature matrix corresponding to the data graph based on a distance between the random graph and the data graph; computing the node embeddings based on the data graph; generating the random graph based on random graph node embeddings computed by the random graph component; generating the random graph based on a data-dependent random feature distribution or a data-independent random feature distribution; computing the graph feature matrix based on a dissimilarity measurement between the random graph and the data graph; generating visual data based on feedback from an entity, where the visual data can comprise data indicative of quality of the random graph, the node embeddings, and/or the random graph node embeddings; employing the graph feature matrix to perform analysis of the data graph; and/or generating the graph feature matrix to facilitate reduced memory consumption associated with the memory and/or improved processing efficiency associated with the processor.

According to multiple embodiments, to facilitate operations described above and/or other operations described throughout the subject disclosure, random graph embedding system 102 and/or components thereof (e.g., random graph component 108, graph embedding component 110, etc.), can employ one or more of the Equations (1), (2), (3), (4) and/or (5) described below and/or execute one or more operations associated therewith. Additionally or alternatively, in some embodiments, random graph embedding system 102 and/or components thereof, can employ algorithm 300 (described below with reference to FIG. 3), algorithm 400 (described below with reference to FIG. 4), and/or one or more convergence operations described below.

In some embodiments, random graph embedding system 102 and/or components thereof, can facilitate transporting a set of node embeddings of raw graphs onto node embeddings of random graphs (e.g., via Earth Mover's Distance (EMD) as described below). In some embodiments, random graph embedding system 102 and/or components thereof, can facilitate determining a Random Features (RF) approximation using a limited number of random graphs drawn from one or more data-independent random feature distributions or one or more data-dependent random feature distributions (e.g., as described below with reference to random graph component 108 and/or graph embedding component 110). In some embodiments, random graph embedding system 102 and/or components thereof, can facilitate generating random graphs by utilizing sampling strategies that incorporate node label information or sampling strategies that do not incorporate node label information (e.g., as described below with reference to random graph component 108 and/or graph embedding component 110).

According to multiple embodiments, random graph embedding system 102 and/or components thereof, can receive data graph 114. For example, random graph embedding system 102 can receive data graph 114 from a remote entity coupled (e.g., communicatively, electrically, operatively, etc.) to random graph embedding system 102 (e.g., via a data cable and/or a network such as, for example the Internet). In some embodiments, data graph 114 can comprise information associated with data elements (e.g., entities, relationships between entities, etc.) that can constitute one or more data graphs (e.g., a graph as defined above). In some embodiments, data graph 114 can comprise information associated with one or more data structures associated with a network of nodes. In some embodiments, data graph 114 can comprise metadata that can provide attributes and/or properties for one or more data structures associated with a network of nodes. In some embodiments, data graph 114 can comprise one or more data graphs associated with a machine learning system (e.g., one or more data graphs that can be processed and/or analyzed by a machine learning system). In some embodiments, data graph 114 can comprise a single data graph or a set of single data graphs. For example, data graph 114 can include first information for a first data graph comprising a first network of nodes and connections, second information for a second data graph comprising a second network of nodes and connections, etc. In some embodiments, data associated with the set of single data graphs can be fixed. In some embodiments, the set of single data graphs can comprise a set of snapshots of the data graphs captured over time. For instance, the set of single graphs can comprise a sequence of data graphs over time. As such, in some embodiments, the set of single graphs can comprise a sequential network snapshot of the graphs. In some embodiments, the set of single graphs can comprise spatial-temporal data. In some embodiments, data graph 114 can comprise information for sequential graph changes. For example, data graph 114 can comprise information associated with changes in a graph sequence for a data graph or a set of data graphs.

Geometric Embeddings of Graphs and Earth Mover's Distance.

In some embodiments, random graph embedding system 102 (e.g., via random graph component 108 and/or graph embedding component 110) can utilize geometric embeddings (e.g., geometric embeddings of graphs) to represent a graph as a bag-of-vectors and/or further employ the transportation distance EMD to facilitate computing a graph feature matrix.

Geometric Embeddings of Graphs.

The following notation will be used throughout the subject disclosure to describe the various embodiments disclosed herein. In some embodiments, a graph (e.g., data graph 114) can be represented as a triplet G=(V,E,l), where $V=\{v_i\}_{i=1}^n$ can represent a set of vertices, $E \subseteq (V \times V)$ can represent a set of undirected edges, and $L:V \to \Sigma$ can constitute a function that assigns labels to nodes from an alphabet $\Sigma$ in the graph. In some embodiments, random graph embedding system 102 and/or components thereof, can operate based on an assumption that each graph (e.g., data graph 114) has n nodes, m edges, and l node labels. In some embodiments, $\mathcal{G}$ can represent a set of N graphs (e.g., data graph 114) where $\mathcal{G}=\{G_i\}_{i=1}^N$ and $\mathcal{Y}$ can represent a set of labels corresponding to each graph in $\mathcal{G}$ where $\mathcal{Y}=\{Y_i\}_{i=1}^N$, where Y can represent a label. In some embodiments, geometric embeddings of a graph G can constitute a set of vectors $U=\{u_i\}_{i=1}^n \in \mathbb{R}^{n \times d}$ or all nodes, where d can represent the size of latent embedding space.

In some embodiments, a graph G can be represented by different forms of matrices based on underlying learning tasks. In some embodiments, without loss of generality, random graph embedding system 102 and/or components thereof, can employ a normalized Laplacian matrix $L=D^{-1/2}(D-A)D^{-1/2}=I-D^{-1/2}AD^{-1/2}$, where I can represent an identity matrix, the adjacency matrix $A_{ij}=1$ if $(v_i, v_j) \in E$ and $A_{ij}=0$ otherwise, and D can represent a weighted degree matrix. In some embodiments, random graph embedding system 102 and/or components thereof, can utilize both unlabeled graphs and graphs with labeled nodes. In some embodiments, random graph embedding system 102 (e.g., via node embedding component 502 as described below with reference to FIG. 5) can facilitate calculation of d smallest eigenvectors of L to obtain U as L's geometric embeddings by performing partial eigendecomposition of $L=U\Lambda U^T$. In some embodiments, random graph embedding system 102 and/or components thereof, can assign each node $V_i$ an embedding vector $u_i \in \mathbb{R}^d$ that can correspond to the i-th row of U. In some embodiments, since the norm of each node embedding can be $\|u_i\|=1$, they can also constitute points in a d-dimensional unit hypercube. In some embodiments, random graph embedding system 102 (e.g., via node embedding component 502 as described below with reference to FIG. 5) can employ an eigensolver to solve eigendecomposition with linear complexity O(dmz) in the number of graph edges, where z can represent a number (e.g., a small number) of iterations. In some embodiments, it should be appreciated that the resulting embeddings of nodes can capture global properties of the graph (e.g., data graph 114) since the eigenvectors associated with low eigenvalues of L can comprise information about the overall shape of G based on spectral graph theory.

Node Transportation Via Earth Mover's Distance.

In some embodiments, random graph embedding system 102 and/or components thereof, can operate based on an assumption that a graph G (e.g., data graph 114) can be represented by a bag-of-vectors $\{u_1, u_2, \ldots, u_n\}$. In some embodiments, to use the bag-of-words model, random graph embedding system 102 and/or components thereof, can also compute weights associated with each node vector. For example, if node $V_i$ has some number $C_i$ of outgoing edges in the corresponding adjacency matrix A of a graph G, random graph embedding system 102 and/or components thereof, can denote $t_i=(c_i/\Sigma_{j=1}^n c_j) \in \mathbb{R}$ as a normalized bag-of-words (nBOW) weight for each node. In some embodiments, random graph embedding system 102 (e.g., via graph embedding component 110) can measure the similarity between a pair of graphs $(G_i,G_j)$ using a proper distance measure. In some embodiments, instead of treating it as an assignment problem solved by maximum weight matching, random graph embedding system 102 and/or components thereof, can cast the task as a transportation problem, which random graph embedding system 102 (e.g., via graph embedding component 110) can address using the Earth Mover's Distance (EMD).

In some embodiments, random graph embedding system 102 (e.g., via graph embedding component 110) can utilize EMD to measure a dissimilarity between a pair of graphs $(G_x,G_y)$ by employing node transportation, which can account for alignments between nodes. In some embodiments, $n=\max(n_x, n_y)$ can denote a maximum number of nodes in a pair of graphs $(G_x,G_y)$. In some embodiments, since $t^{(G_x)}$ can represent a nBOW weight vector for the graph $G_x$, random graph embedding system 102 (e.g., via graph embedding component 110) can determine that $(t^{(G_x)})^T 1=1$. In some embodiments, random graph embedding system 102 (e.g., via graph embedding component 110) can similarly determine $(t^{(G_y)})^T 1=1$. In some embodiments, random graph embedding system 102 (e.g., via graph embedding component 110) can define the EMD as follows, $$EMD(G_x, G_y) := \min_{\mathcal{T} \in \mathbb{R}_+^{n_x \times n_y}} \langle \mathcal{D}, \mathcal{T} \rangle, \quad \text{Equation (1)}$$

such that, $\mathcal{T}1 = t^{(G_x)}, \mathcal{T}^T 1 = t^{(G_y)}$ where $\mathcal{T}$ can represent the transportation flow matrix, $\mathcal{T}$ can denote how much of node $V_i$ in $G_x$ travels to node $V_j$ in $G_y$, and $\mathcal{D}$ can represent the transportation cost matrix where each item $\mathcal{D}_{ij}=d(u_i,u_j)$ can denote a distance between two nodes measured in their embedding space. In some embodiments, random graph embedding system 102 (e.g., via graph embedding component 110) can employ the Euclidean distance to compute $d(u_i,u_j)=\|u_i-u_j\|_2$. In some embodiments, when the total weights of two graphs are equal and $d(u_i, u_j)$ comprises a metric in the Euclidean distance, the EMD (equation (1) above) can qualify as a metric, meaning that it can satisfy the triangle inequality. It should be appreciated that the EMD can support accurate measurement of a distance between graphs with different nodes that are contextually similar but in different positions. It should be further appreciated that the EMD distance can perform well on text categorization and graph classification. However, it should also be appreciated that the EMD can be expensive to compute. For example, the EMD computational complexity can be $O(n^3 \log(n))$, and for large graphs, n can be a large value. Additionally, it should be appreciated that building a kernel matrix using EMD does not lead to a positive PD kernel, which can impair its use and performance.

Scalable Global Graph Kernel Using Random Features.

In some embodiments, random graph embedding system 102 and/or components thereof, can construct a PD global graph kernel from the EMD and provide a scalable method to compute expressive graph embeddings via an RF approximation (e.g., as described below). In some embodiments, random graph embedding system 102 and/or components thereof, can also generate graph embeddings comprising an inner product that can yield a uniform convergence to the exact kernel.

Global Graph Kernel Using EMD and RF.

In some embodiments, random graph embedding system 102 can comprise a PD global graph kernel that can be defined as follows, $$k(G_x, G_y) := \int p(G_\omega) \phi G_\omega(G_x) \phi G_\omega(G_y) dG_\omega \qquad \text{Equation (2)}$$

where $\phi G_\omega(G_x) := \exp(-\gamma EMD(G_x, G_\omega))$.

In some embodiments, $G_\omega$ can represent a random graph comprising a number D of random nodes and their associated node embeddings $W=\{w_i\}_{i=1}^D \in \mathcal{V}$, $p(G_\omega)$ can represent a distribution over a space of all random graphs of variable graph sizes $\Omega := \cup_{D=1}^{D_{max}} \mathcal{V}^D$. In some embodiments, $p(G_\omega)$ can represent a probability density and can represent a parameter that can control the degree of smoothness. In some embodiments, random graph embedding system 102 and/or components thereof, can derive an infinite-dimensional feature map $\phi G_\omega(G_x)$ from the EMD between $G_x$ and all possible random graphs $G_\omega \in \Omega$. In some embodiments, random graph embedding system 102 (e.g., via random graph component 108) can facilitate a small random graph implicitly partitioning a larger raw graph by employing node transportation (or node alignments) in the corresponding node embedding space using EMD, for example, as illustrated in FIG. 2.

Figure 2:
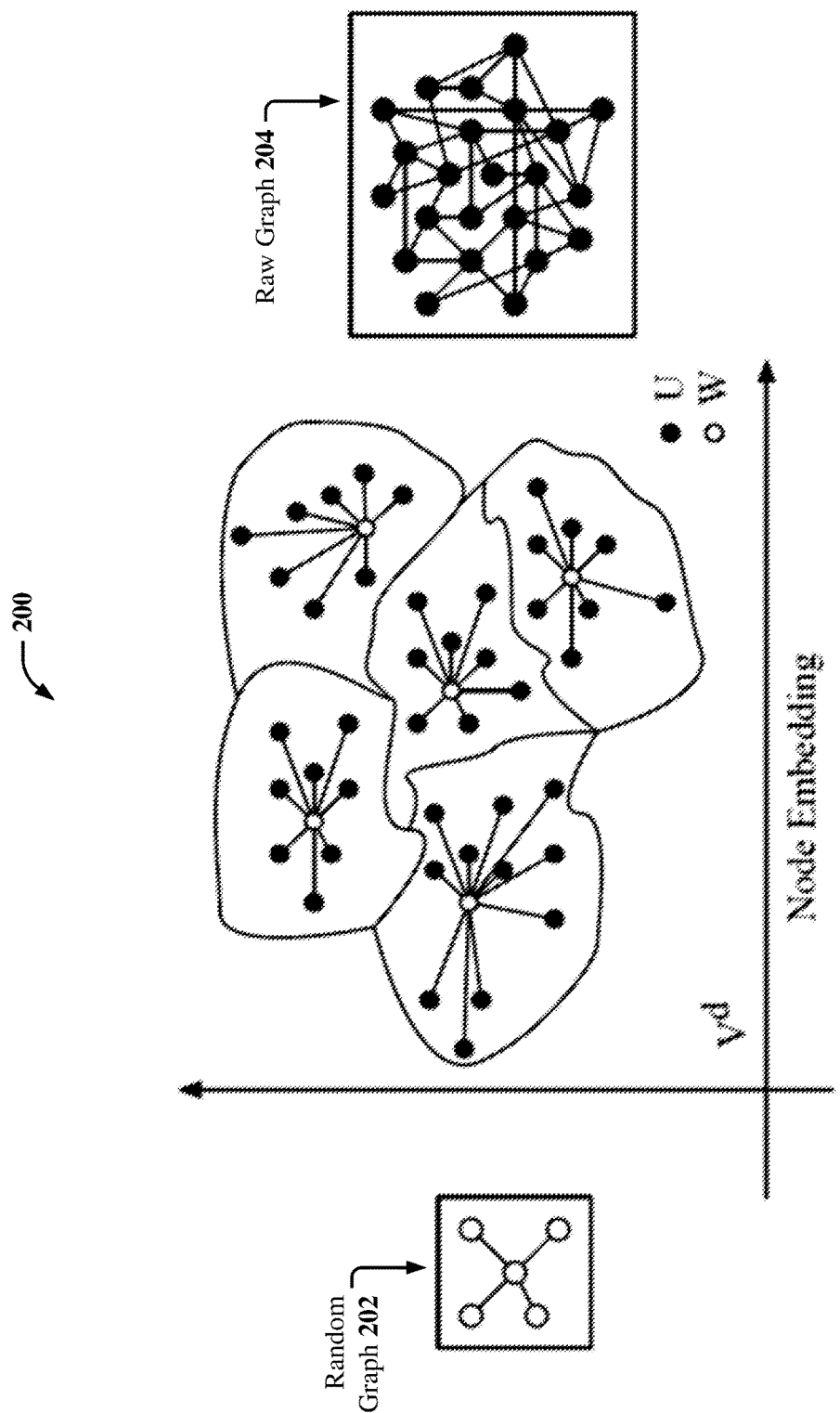
FIG. 2 illustrates an example, non-limiting system that facilitates random graph embedding components in accordance with one or more embodiments described herein.

FIG. 2 illustrates an example, non-limiting system 200 that facilitates random graph embedding components in accordance with one or more embodiments described herein. According to multiple embodiments, system 200 can comprise one or more random graphs 202 and/or one or more raw graphs 204. In some embodiments, system 200 can comprise an example illustration of how the EMD can be employed by random graph embedding system 102 (e.g., via graph embedding component 110 as described below) to measure a distance between random graph 202 and raw graph 204. In such embodiments, random graph 202 can implicitly partition raw graph 204 via node alignments in a low dimensional node embedding space (e.g., as illustrated in FIG. 2).

Returning to FIG. 1, in some embodiments, random graph embedding system 102 can comprise a PD global graph kernel that can be defined as follows, $$k(G_x, G_y) := \qquad \text{Equation (3)}$$
$$\exp(-\gamma \text{softmin}_{p(G_\omega)}\{EMD(G_x, G_\omega) + EMD(G_\omega, G_y)\})$$

where, $$\text{softmin}_{p(G_\omega)}\{f(G_\omega)\} := -\frac{1}{\gamma} \log \int p(G_\omega) e^{-\gamma f(G_\omega)} dG_\omega \qquad \text{Equation (4)}$$

can comprise a version of the soft minimum function parameterized by $p(G\omega)$ and $\gamma$. In some embodiments, compared to the normal definition of soft minimum softmin$_i f_i := -$softmax$_i(-f_i) = -\log \Sigma_i e^{-f_i}$, Equation (4) can comprise a smoothed version of such soft minimum definition that can be reweighted by a probability density $p(G_\omega)$ and one more parameter $\gamma$ that can control the degree of smoothness. In some embodiments, the value of Equation (4) can be mostly determined (e.g., via random graph embedding system 102 and/or components thereof) by the minimum of $f(G_\omega)$, when $f(G_\omega)$ is Lipschitz-continuous and $\gamma$ is large.

In some embodiments, since EMD can comprise a metric, random graph embedding system 102 can derive $$EMD(G_x, G_y) \leq \min_{G_\omega \in \Omega} (EMD(G_x, G_\omega) + EMD(G_\omega, G_y))$$

by the triangle inequality, and the equality can hold if the size of the random graph $D_{max}$ (e.g., the size of random graph 202) is not smaller than the original graph size n. It should be appreciated, therefore, that the kernel value in Equation (3) can serve as a good approximation to the EMD between any pair of graphs $G_x, G_y$ and by the kernel definition it must be positive-definite.

Random Graph Embedding: Random Features of Global Graph Kernel.

Efficient Computation of RGE.

In some embodiments, exact computation of the kernel in Equation (2) is often infeasible, as it does not admit a simple analytic solution. In some embodiments, however, since random graph embedding system 102 and/or components thereof, can define a global graph kernel in terms of a randomized kernel approximation, such components can generate the following random approximation as, Equation (5):

$$k(G_x, G_y) \approx \langle Z(G_x), Z(G_y) \rangle = \frac{1}{R} \sum_{i=1}^R \phi_{G_{\omega i}}(G_x) \phi_{G_{\omega i}}(G_y)$$

where $\{G_{\omega i}\}_{i=1}^R$ can represent random graphs drawn from $p(G_\omega)$, R can represent the number of random graphs sampled from a distribution, and $$Z(G_x) := \left(\frac{1}{\sqrt{R}}\phi_{G_{\omega,i}}(G_x)\right)_{i=1}^R$$

can comprise a vector representation of graph $G_x$. In some embodiments, such a vector representation of graph $G_x$ can constitute random approximation Random Graph Embedding (RGE), which can (e.g., via implementation by random graph embedding system 102 and/or components thereof) converge to the exact kernel of Equation (2) uniformly over all pairs of graphs $(G_x, G_y)$.

FIG. 3 illustrates an example, non-limiting algorithm 300 that facilitates random graph embedding components in accordance with one or more embodiments described herein. In some embodiments, algorithm 300 can comprise a Random Graph Embedding algorithm. According to multiple embodiments, random graph embedding system 102 and/or components thereof (e.g., random graph component 108, graph embedding component 110, etc.), can facilitate performance of various operations described herein by executing one or more sections of algorithm 300.

Returning to FIG. 1, in some embodiments, algorithm 300 can comprise a procedure to generate feature vectors for data graphs. In some embodiments, the distribution $p(G_\omega)$ can be key to generating (e.g., via random graph component 108) high-quality node embeddings for random graphs, that can capture global structure information of nodes in raw graphs (e.g., raw graph 204) in the corresponding node embedding space. In some embodiments, random graph embedding system 102 and/or random graph component 108 can employ two different methods (e.g., data-dependent random feature distribution and data-independent random feature distribution, as described below) to generate one or more random graphs (e.g., random graph 202). In some embodiments, the size D of the random graphs can be small. In some embodiments, random graph embedding system 102 and/or components thereof (e.g., random graph component 108) can uniformly sample the size of random graphs from a range $[1, D_{max}]$ to determine an unbiased estimate of D.

In some embodiments, by efficiently approximating the disclosed PD global graph kernel using RGE, random graph embedding system 102 can facilitate improved processing accuracy and/or reduced computation. For example, a conventional evaluation of EMD can have complexity $O(n^3 \log(n))$ and thus, the existing graph kernels require at least $O(N^2 n^3 \log(n))$ computational complexity and $O(N^2)$ memory consumption, in terms of the number of graphs N and the size of graph n. However, according to multiple embodiments, based on the small size of random graphs (e.g., random graph 202) utilized by random graph embedding system 102, one evaluation of EMD performed by random graph embedding system 102 only requires $O(D_n^2 \log(n))$ and therefore, random graph embedding system 102 only requires computation with the quasi-linear complexity $O(n \log(n))$ where D comprises a constant and/or a small number. Further, in some embodiments, by utilizing a state-of-the-art eigensolver, random graph embedding system 102 (e.g., via node embedding component 502) can effectively compute the d largest eigenvectors with linear complexity $O(dm z)$. Therefore, in several embodiments, the total computational complexity and memory consumption of random graph embedding system 102 are $O(N Rn \log(n) + dm z)$ and $O(NR)$, respectively. Consequently, in such embodiments, compared to other graph kernels, random graph embedding system 102 can reduce computational complexity from quadratic to linear in terms of the number of graphs, and from (quasi-)cubic to (quasi-)linear in terms of the graph size.

Data-Independent and Data-Dependent Distributions.

In some embodiments, random graph embedding system 102 (e.g., via random graph component 108) can generate one or more high-quality random graphs (e.g., random graphs 202) by employing a data-dependent random feature distribution. For example, random graph embedding system 102 (e.g., via random graph component 108) can utilize traditional RF approximation to obtain random samples from a distribution corresponding to an entity's (e.g., an end user) predefined kernel (e.g. Gaussian kernels, Laplacian kernels, etc.). In some embodiments, however, since random graph embedding system 102 and/or components thereof, can reverse the order by first defining the distribution and then define a kernel, random graph embedding system 102 and/or components thereof, can select any distribution that can capture the characteristics of the graph data well. In some embodiments, where all node embeddings are normalized in a d-dimensional unit hypercube space, random graph embedding system 102 and/or components thereof, can first compute the largest and smallest elements in all node embeddings (e.g., via node embedding component 502) and then use a uniform distribution in the range of these two values to generate a set of d-dimensional vectors for random node embeddings in a random graph (e.g., via random graph component 108). In some embodiments, since node embeddings can be roughly dispersed uniformly in the d-dimensional unit hypercube space, this scheme works well in most cases. In some embodiments, similar to the traditional RF, this sampling scheme can be data-independent and therefore, can constitute an RGE(RF).

In some embodiments, random graph embedding system 102 (e.g., via random graph component 108) can generate one or more high-quality random graphs (e.g., random graphs 202) by employing a data-independent random feature distribution. For example, random graph embedding system 102 (e.g., via random graph component 108) can utilize a data-independent random feature distribution scheme that can facilitate sampling parts of graphs (e.g., from training data) as random graphs, which can constitute an Anchor Sub-Graphs (ASG) scheme RGE(ASG). In some embodiments, such an ASG scheme can facilitate defining an indefinite feature space since there are conceptually unlimited numbers of sub-graphs (e.g., in contrast to a limited number of graphs). In some embodiments, such an ASG scheme can facilitate randomly producing graph nodes that can resemble graph nodes in the embedding space, which can help to identify more hidden global structural information instead of only considering raw graph topology. In some embodiments, by implementing EMD, hidden global structure, such as contextually similar but positionally different nodes in two graphs, can be captured well through node alignments. In some embodiments, such an ASG scheme allows exploiting node label information in raw graphs (e.g., raw graph 204) since this information is also accessible through the sampled nodes in sub-graphs.

In some embodiments, random graph embedding system 102 (e.g., via random graph component 108) can incorporate node label information into RGE(ASG) by assigning nodes with same labels a smaller distance than nodes with different labels. In some embodiments, therefore, random graph embedding system 102 (e.g., via random graph component 108) can set the distance according to $d(u_i, u_j) = \max(\|u_i - u_j\|_2, \sqrt{d})$ if nodes $v_i$ and $v_j$ have different node labels since d can be the largest distance in a d-dimensional unit hypercube space. In some embodiments, random graph embedding system 102 (e.g., via random graph component 108) can execute algorithm 400 depicted in FIG. 4 to implement either of the two sampling strategies described here, RGE (RF) or RGE(ASG), to generate a set of node embeddings of a random graph (e.g., random graph 202).

FIG. 4 illustrates an example, non-limiting algorithm 400 that facilitates random graph embedding components in accordance with one or more embodiments described herein. In some embodiments, algorithm 400 can comprise a Random Graph Generation algorithm. According to multiple embodiments, random graph embedding system 102 and/or components thereof (e.g., random graph component 108, graph embedding component 110, etc.), can facilitate performance of various operations described herein by executing one or more sections of algorithm 400.

Convergence of Random Graph Embedding.

Returning to FIG. 1, in some embodiments, random graph embedding system 102 and/or components thereof, can establish a bound on the number of random graphs (e.g., random graphs 202) required to determine an $\epsilon$ approximation between the exact kernel (e.g., Equation (2)) and its random feature approximation (e.g., Equation (5)) denoted by $\tilde{k}(G_x, G_y)$. In some embodiments, to facilitate establishing such a bound, random graph embedding system 102 and/or components thereof, can establish a covering number for the space $\chi$ under the EMD metric.

Lemma 1.

In some embodiments, there can be an $\epsilon$-covering $\varepsilon$ of $\chi$ under the metric defined by EMD, for example, using Euclidean ground distance such that:

$$\forall G \in \mathcal{X}, \exists G_i \in \mathcal{E}, EMD(G, G_i) \le \epsilon \text{ with } |\mathcal{E}| \le \left(\frac{2}{\epsilon}\right)^{Md},$$

where M can be an upper bound on the number of nodes for any graph $G \in \chi$. In some embodiments, random graph embedding system 102 and/or components thereof, can provide a bound on the number of random features required for an $\epsilon$ approximation.

Theorem 1.

In some embodiments, random graph embedding system 102 and/or components thereof, can operate based on $\Delta_R(G_x, G_y) = k(G_x, G_y) - \tilde{k}(G_x, G_y)$ and/or a uniform convergence of:

$$P\left\{\max_{G_x, G_y \in \mathcal{X}} |\Delta_R(G_x, G_y)| > 2t\right\} \le 2\left(\frac{12\gamma}{t}\right)^{2Md} e^{-Rt^2/2}$$

In some embodiments, therefore, to determine $|\Delta_R(G_x, G_y)| \le \epsilon$ with probability at least $1-\delta$, it can suffice to have:

$$R = \Omega\left(\frac{Md}{\epsilon^2}\log\left(\frac{\gamma}{\epsilon}\right) + \frac{1}{\epsilon^2}\log\left(\frac{1}{\delta}\right)\right)$$

In some embodiments, the above theorem can state that, to find an $\epsilon$ approximation to the exact kernel, it can suffice to have a number of random features $$R = \Omega\left(\frac{Md}{\epsilon^2}\right).$$

According to multiple embodiments, random graph embedding system 102 can employ random graph component 108 and graph embedding component 110 to compute a graph feature matrix corresponding to a data graph based on a distance between a random graph and the data graph. In some embodiments, to facilitate computing such a graph feature matrix, random graph component 108 and/or graph embedding component 110 can employ Equations (1)-(5) and/or operations associated therewith, algorithm 300, algorithm 400, and/or the convergence operations describe above.

According to multiple embodiments, random graph embedding system 102 can employ random graph component 108 and graph embedding component 110 to compute a graph feature matrix corresponding to a data graph based on a distance between a random graph and the data graph. In some embodiments, to facilitate computing such a graph feature matrix, random graph embedding system 102 can employ random graph component 108 to generate a random graph based on node embeddings corresponding to a data graph. For instance, random graph component 108 can generate random graph 202 based on node embeddings computed by node embedding component 502 (e.g., as described below with reference to FIG. 5), where the node embeddings can correspond to data graph 114.

In some embodiments, random graph component 108 can generate a random graph (e.g., random graph 202) by implementing line 5 of algorithm 300 depicted in FIG. 3 and algorithm 400 depicted in FIG. 4. For example, random graph component 108 can implement algorithm 400 to generate random node embeddings W (e.g., which can constitute random graph node embeddings) and use such node embeddings W to implement line 5 of algorithm 300 to generate random graph 202. In some embodiments, random graph component 108 can generate a random graph based on a data-dependent random feature distribution or a data-independent random feature distribution. For example, random graph component 108 can execute algorithm 400 to generate a random graph based on data-dependent random feature distribution RGE(RF) or data-independent random feature distribution RGE(ASG).

According to multiple embodiments, graph embedding component 110 can compute a graph feature matrix corresponding to data graph 114 based on a dissimilarity measurement between a random graph (e.g., random graph 202) and a data graph (e.g., data graph 114, raw graph 204, etc.). For example, graph embedding component 110 can compute graph feature matrix 116. In some embodiments, to compute such a graph feature matrix (e.g., graph feature matrix 116), graph embedding component 110 can employ EMD (e.g., as described above) to determine a dissimilarity measurement between random graph 202 and data graph 114 (or raw graph 204), where random graph 202 can be generated by random graph component 108 as described above. In some embodiments, to compute such a graph feature matrix (e.g., graph feature matrix 116), graph embedding component 110 can employ Wasserstein distance or another distance measure technique to determine a dissimilarity measurement between random graph 202 and data graph 114 (or raw graph 204). In some embodiments, to facilitate computing such a graph feature matrix (e.g., graph feature matrix 116), graph embedding component 110 can implement algorithm 300 depicted in FIG. 3 to compute the graph feature matrix. For instance, graph embedding component 110 can implement algorithm 300 to compute a feature matrix $Z_{N \times R}$ such as, for example, $$Z(\{G_i\}_{i=1}^{N}) = \frac{1}{\sqrt{R}} \{Z_i\}_{i=1}^{R}.$$

Figure 5:
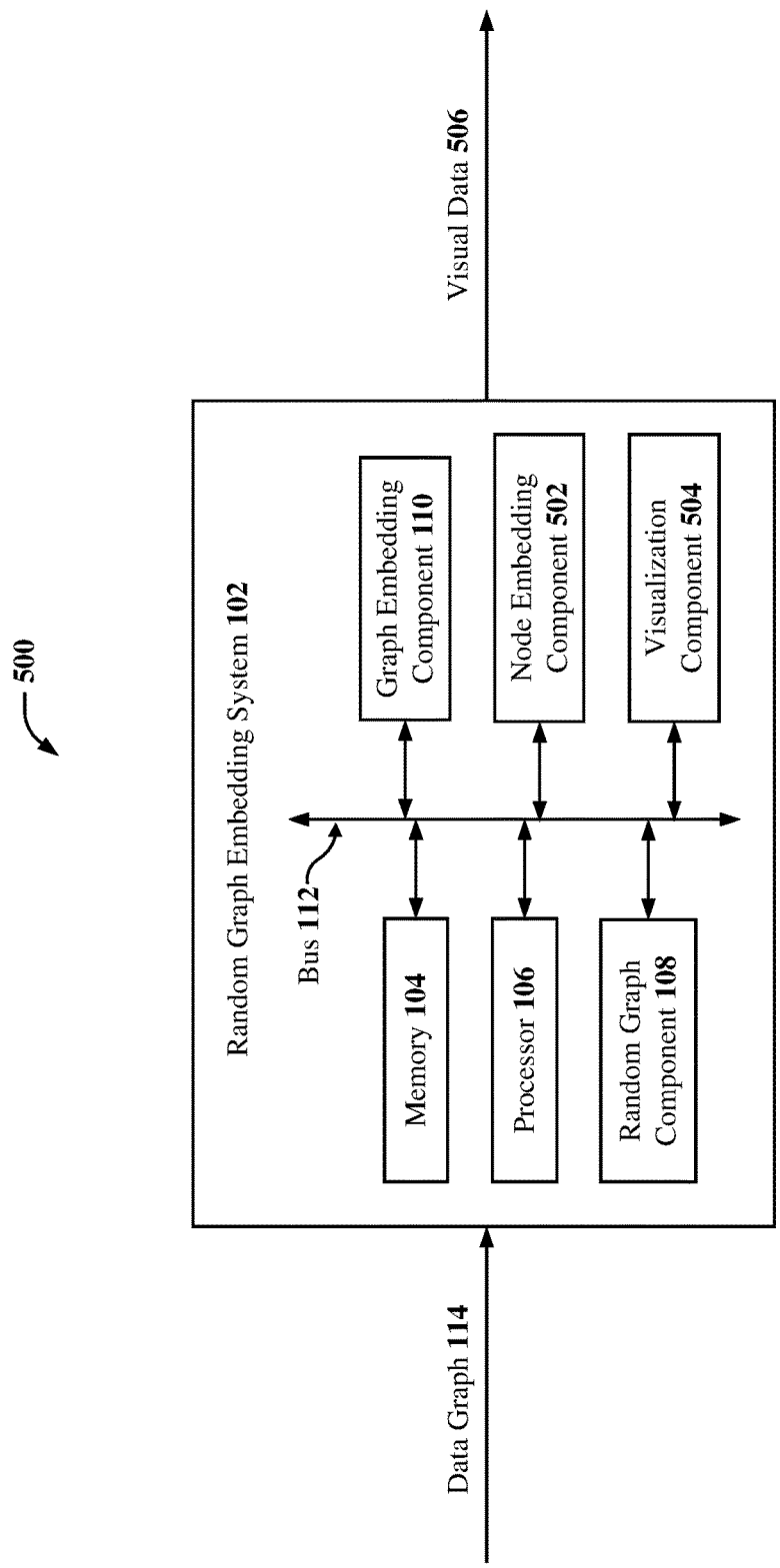
FIG. 5 illustrates a block diagram of an example, non-limiting system that facilitates random graph embedding components in accordance with one or more embodiments described herein.

FIG. 5 illustrates a block diagram of an example, non-limiting system 500 that facilitates random graph embedding components in accordance with one or more embodiments described herein. In some embodiments, system 500 can comprise random graph embedding system 102. In some embodiments, random graph embedding system 102 can comprise a node embedding component 502 and/or a visualization component 504. Repetitive description of like elements employed in respective embodiments is omitted for sake of brevity.

According to multiple embodiments, node embedding component 502 can compute node embeddings based on a data graph. For example, node embedding component 502 can compute geometric node embeddings based on data graph 114. In some embodiments, node embedding component 502 can compute geometric node embeddings by representing a data graph (e.g., data graph 114, random graph 202, raw graph 204, etc.) as an adjacency matrix (e.g., adjacency matrix A or $A_{ij}$) and employing eigendecomposition (e.g., as described above with reference to FIG. 1). In some embodiments, node embedding component 502 can compute geometric node embeddings by employing techniques including, but not limited to, deepwalk, node2vec, Large-scale Information Network Embedding (LINE), and/or another geometric node embedding technique. In some embodiments, node embedding component 502 can compute node embeddings that can be used as inputs to algorithm 400. For example, node embedding component 502 can compute node embeddings $U=\{u_i\}_{i=1}^{n}$, which can be used as inputs by random graph component 108 to generate random graph 202 via implementing algorithm 400 (e.g., as described above).

According to multiple embodiments, visualization component 504 can facilitate data visualization associated with one or more random graphs (e.g., random graph 202), geometric node embeddings, and/or random graph node embeddings. For example, visualization component 504 can generate visual data 506 that can comprise visual data indicative of the quality of, for instance: random graph 202 and/or random graph node embeddings generated by random graph component 108; geometric node embeddings generated by node embedding component 502; and/or graph feature matrix 116 generated by graph embedding component 110. For example, visual data 506 can be indicative of visual statistics associated with data graph 114 and/or spatial-temporal network diagnosis of data graph 114.

In some embodiments, visual data 506 can be rendered on a display as one or more dynamic visual elements, where visual characteristics (e.g., content, visual property, size, hue, shading, etc.) of visual data 506 can be altered based on the quality of random graph 202, the geometric node embeddings, the random graph node embeddings, and/or graph feature matrix 116. For example, visualization component 504 can facilitate display of visual data 506 on a display device. For instance, visualization component 504 can render visual data 506 on a display device (e.g., a monitor, a screen, etc.) of random graph embedding system 102 and/or a display device coupled (e.g., communicatively, electrically, operatively, etc.) to random graph embedding system 102. In some embodiments, such a display device can comprise, for example, a computing device with a display, a computer, a desktop computer, a laptop computer, a monitor device, a smart device, a smart phone, a mobile device, a handheld device, a tablet, a wearable device, a portable computing device, and/or another type of device associated with a display.

In some embodiments, visualization component 504 can generate an interface (e.g., a graphical user interface (GUI)) to display at least a portion of visual data 506 in a human interpretable format. In some embodiments, visualization component 504 can provide entity (e.g., a human user) interaction associated with visual data 506. For instance, visualization component 504 can generate visual data 506 based on feedback from an entity (e.g., a human user). For example, such entity feedback can be indicative of real-time feedback from an entity (e.g., a human user) input to visualization component 504 and/or random graph embedding system 102 via a display device. In some embodiments, such entity feedback can be indicative of real-time feedback from an entity associated with a machine learning system that processes and/or analyzes random graph 202, the geometric node embeddings, the random graph node embeddings, and/or graph feature matrix 116. In some embodiments, such entity feedback can facilitate modification of a graph similarity analytics process and/or a machine learning process associated with random graph embedding system 102 and/or components thereof (e.g., random graph component 108, graph embedding component 110, etc.). For example, a graph similarity analytics process (e.g., random graph embedding) associated with random graph embedding system 102 and/or components thereof, can be repeated to improve one or more aspects of such a process (e.g., a degree of similarity between graphs) based on the entity feedback. In another example, a machine learning process associated with random graph embedding system 102 and/or components thereof, can be repeated to improve anomaly detection and/or classification associated with graphs based on the entity feedback.

Figure 6:
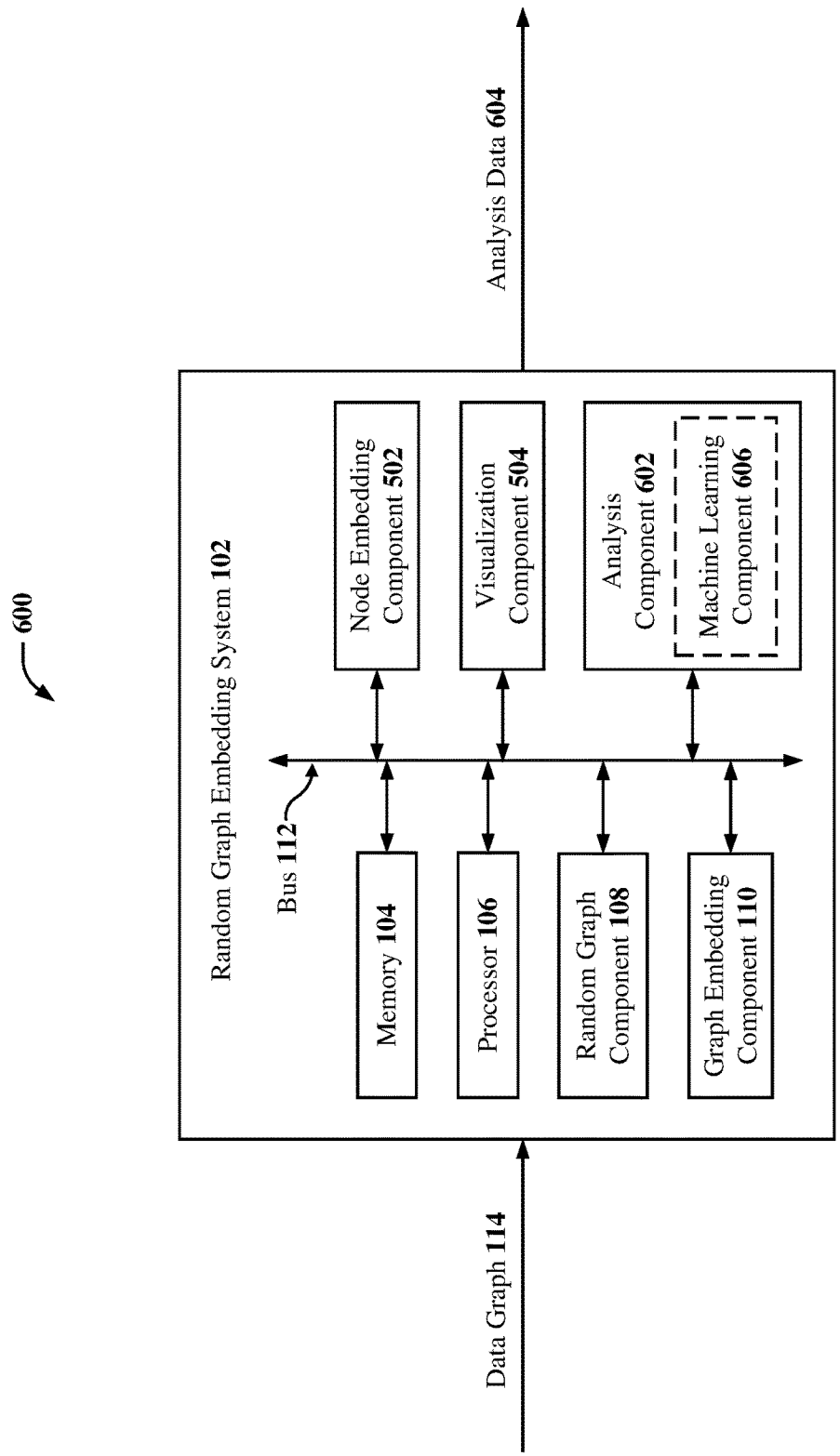
FIG. 6 illustrates a block diagram of an example, non-limiting system that facilitates random graph embedding components in accordance with one or more embodiments described herein.

FIG. 6 illustrates a block diagram of an example, non-limiting system 600 that facilitates random graph embedding components in accordance with one or more embodiments described herein. In some embodiments, system 600 can comprise random graph embedding system 102. In some embodiments, random graph embedding system 102 can comprise an analysis component 602, which can comprise a machine learning component 606. Repetitive description of like elements employed in respective embodiments is omitted for sake of brevity.

According to multiple embodiments, analysis component 602 can employ graph feature matrix 116 to perform analysis of data graph 114. In some embodiments, analysis component 602 can perform spatial-temporal analysis of data graph 114 based on graph feature matrix 116. In some embodiments, analysis component 602 can perform anomaly detection associated with data graph 114 based on graph feature matrix 116. In some embodiments, analysis component 602 can perform graph clustering and/or classification of data graph 114 based on graph feature matrix 116. In some embodiments, analysis component 602 can employ a graph similarity computation (e.g., random graph embedding via implementation of one or more Equations (1)-(5) as described herein) associated with data graph 114 to perform analysis of data graph 114 (e.g., via graph feature matrix 116). In some embodiments, analysis component 602 can employ graph feature matrix 116 to perform task-dependent analysis of data associated with a machine learning system. In some embodiments, analysis component 602 can generate analysis data 604 based on the analysis of data graph 114 using graph feature matrix 116. In some embodiments, analysis data 604 can include, but is not limited to, information associated with the spatial-temporal analysis, the anomaly detection, the graph clustering and/or the classification associated with data graph 114 and/or graph feature matrix 116.

According to multiple embodiments, machine learning component 606 can perform one or more machine learning processes to facilitate analysis of data graph 114 based on graph feature matrix 116. In some embodiments, machine learning component 606 can employ machine learning and/or principles of artificial intelligence (e.g., a machine learning process) to learn one or more features and/or information related to data graph 114 using, for example, graph feature matrix 116. In some embodiments, machine learning component 606 can employ machine learning and/or principles of artificial intelligence (e.g., a machine learning process) to generate analysis data 604. In some embodiments, machine learning component 606 can perform learning with respect to learning one or more features and/or information related to data graph 114 explicitly or implicitly. In some embodiments, machine learning component 606 can learn one or more features and/or information related to data graph 114 based on classifications, correlations, inferences and/or expressions associated with principles of artificial intelligence. For instance, machine learning component 606 can employ an automatic classification system and/or an automatic classification process to learn one or more features and/or information related to data graph 114. In one example, machine learning component 606 can employ a probabilistic and/or statistical-based analysis (e.g., factoring into the analysis utilities and costs) to learn and/or generate inferences with respect to data graph 114. In some embodiments, machine learning component 606 can include an inference component (not shown) that can further enhance automated aspects of machine learning component 606 utilizing in part inference-based schemes to learn one or more features and/or information related to data graph 114.

In some embodiments, machine learning component 606 can employ any suitable machine-learning based techniques, statistical-based techniques and/or probabilistic-based techniques. For example, machine learning component 606 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or another technique. In some embodiments, machine learning component 606 can perform a set of machine learning computations associated with learning one or more features and/or information related to data graph 114. For example, machine learning component 606 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more features and/or information related to data graph 114.

In some embodiments, random graph embedding system 102 can be a random graph embedding system and/or process associated with various technologies. For example, random graph embedding system 102 can be associated with data analysis technologies, data analytics technologies, graph database technologies, graph computing technologies, cloud computing technologies, computer technologies, server technologies, information technologies, machine learning technologies, artificial intelligence technologies, digital technologies, and/or other technologies.

In some embodiments, random graph embedding system 102 can provide technical improvements to systems, devices, components, operational steps, and/or processing steps associated with the various technologies identified above. For example, random graph embedding system 102 can derive and/or implement one or more scalable positive-definite (PD) global graph kernels that can account for global properties of graphs. For instance, random graph embedding system 102 can derive and/or implement one or more scalable positive-definite (PD) global graph kernels that can facilitate improved graph classification accuracy compared with other graph kernels. In another example, random graph embedding system 102 can derive and/or implement one or more scalable positive-definite (PD) global graph kernels that can facilitate (quasi-)linear scalability in terms of the number of graphs and/or graph size.

In some embodiments, random graph embedding system 102 can also provide technical improvements to a graph similarity analytics system by improving processing performance of the graph similarity analytics system, improving processing efficiency of the graph similarity analytics system, reducing memory storage employed by the graph similarity analytics system, and/or reducing computation complexity associated with the graph similarity analytics system. In some embodiments, to facilitate such improvements, random graph embedding system 102 and/or components thereof, can implement one or more scalable PD global graph kernel computations such as, for example, the random graph embedding computations described herein with reference to FIGS. 1-6 (e.g., Equations (1)-(5)). In these embodiments, such computations can facilitate reduced memory storage (e.g., of memory 104) and/or improved processing speed (e.g., of processor 106) employed by random graph embedding system 102.

In some embodiments, by efficiently approximating the disclosed PD global graph kernel using RGE, random graph embedding system 102 can facilitate improved processing accuracy (e.g., of processor 106) and/or reduced computation (e.g., by processor 106). For example, a conventional evaluation of EMD can have complexity $O(n^3 \log(n))$ and thus, the existing graph kernels require at least $O(N^2 n^3 \log(n))$ computational complexity and $O(N^2)$ memory consumption, in terms of the number of graphs N and the size of graph n. However, according to multiple embodiments, based on the small size of random graphs (e.g., random graph 202) utilized by random graph embedding system 102, one evaluation of EMD performed by random graph embedding system 102 only requires $O(D_n^2 \log(n))$ and therefore, random graph embedding system 102 only requires computation with the quasi-linear complexity $O(n \log(n))$ where D comprises a constant and/or a small number. Further, in some embodiments, by utilizing a state-of-the-art eigensolver, random graph embedding system 102 (e.g., via node embedding component 502) can effectively compute the d largest eigenvectors with linear complexity $O(dm\tilde{z})$. Therefore, in several embodiments, the total computational complexity and memory consumption (e.g., of memory 104) of random graph embedding system 102 are $O(N \text{ Rn log}(n)+dm\tilde{z})$ and $O(NR)$, respectively. Consequently, in such embodiments, compared to other graph kernels, random graph embedding system 102 can reduce computational complexity from quadratic to linear in terms of the number of graphs, and from (quasi-)cubic to (quasi-)linear in terms of the graph size.

In an example, a graph (e.g., data graph 114, random graph 202, raw graph 204, etc.) can be associated with a technical application such as brain network analysis associated with a digital representation of a brain network, anomaly detection in dynamic networked systems, online graph analytics, streaming data graph analytics, temporal analysis in biological networks, graph pattern mining, graph pattern searches, another technical application, etc. In an embodiment, the scalable PD global graph kernel computations described here with reference to FIGS. 1-6 can be implemented for multi-task graph mining.

In some embodiments, a graph feature matrix (e.g., graph feature matrix 116) associated with a dissimilarity measurement between a random graph and a data graph or a raw graph can be determined. In another embodiment, the graph feature matrix can be applied to a machine learning system related to graphs and/or an artificial intelligence system related to graphs. As such, accuracy of a similarity computation between graphs can be improved. The graph feature matrix can be employed by a machine learning system and/or an artificial intelligence system. For example, spatial-temporal network analysis can be performed based on the graph feature matrix. In another example, anomaly detection can be performed based on the graph feature matrix. In yet another example, graph clustering and/or classification can be performed based on the graph feature matrix. In certain embodiments, data visualization and/or user interaction can be employed to facilitate the graph feature matrix. Accordingly, accuracy of data generated by a machine learning process associated with data graphs can be improved, quality of a machine learning process associated with data graphs can be improved, speed of data generated by a machine learning process associated with data graphs can be improved, and/or a cost for analyzing data using a machine learning process associated with data graphs can be reduced. Furthermore, memory consumption associated with graph similarity analytics, processing consumption associated with graph similarity analytics, and/or computation complexity associated with graph similarity analytics can be reduced. Additionally, efficiency and/or performance of a graph similarity analytics process and/or a machine learning process associated with data graphs can be improved. Moreover, several different graph tasks capable of being performed by a machine learning system and/or an artificial intelligence system can be improved.

In some embodiments, random graph embedding system 102 can provide technical improvements to a processing unit associated with one or more resources of a graph similarity analytics system (e.g., processor 106). For example, as described above, random graph embedding system 102 can facilitate improving processing performance of the processing unit, improving processing efficiency of the processing unit, and/or reducing an amount of time for the processing unit to perform a graph similarity analytics process.

In some embodiments, random graph embedding system 102 can employ hardware and/or software to solve problems that are highly technical in nature, that are not abstract and that cannot be performed as a set of mental acts by a human. In some embodiments, some of the processes described herein may be performed by one or more specialized computers (e.g., one or more specialized processing units, a specialized computer with graph similarity analytics component, etc.) for carrying out defined tasks related to graph similarity analytics and/or machine learning. In some embodiments, random graph embedding system 102 and/or components thereof, can be employed to solve new problems that arise through advancements in technologies mentioned above, employment of cloud-computing systems, computer architecture, and/or another technology.

It is to be appreciated that random graph embedding system 102 can perform a virtual container inspection process utilizing various combinations of electrical components, mechanical components, and circuitry that cannot be replicated in the mind of a human or performed by a human. For example, generating a random graph based on node embeddings corresponding to a data graph and/or computing a graph feature matrix corresponding to the data graph based on a distance between the random graph and the data graph, are operations that are greater than the capability of a human mind. For instance, the amount of data processed, the speed of processing such data, and/or the types of data processed by random graph embedding system 102 over a certain period of time can be greater, faster, and/or different than the amount, speed, and/or data type that can be processed by a human mind over the same period of time.

According to several embodiments, random graph embedding system 102 can also be fully operational towards performing one or more other functions (e.g., fully powered on, fully executed, etc.) while also performing the above-referenced random graph embedding process. It should be appreciated that such simultaneous multi-operational execution is beyond the capability of a human mind. It should also be appreciated that random graph embedding system 102 can include information that is impossible to obtain manually by an entity, such as a human user. For example, the type, amount, and/or variety of information included in random graph component 108, graph embedding component 110, data graph 114, graph feature matrix 116, node embedding component 502, visualization component 504, visual data 506, analysis component 602, analysis data 604, and/or machine learning component 606 can be more complex than information obtained manually by a human user.

Figure 7:
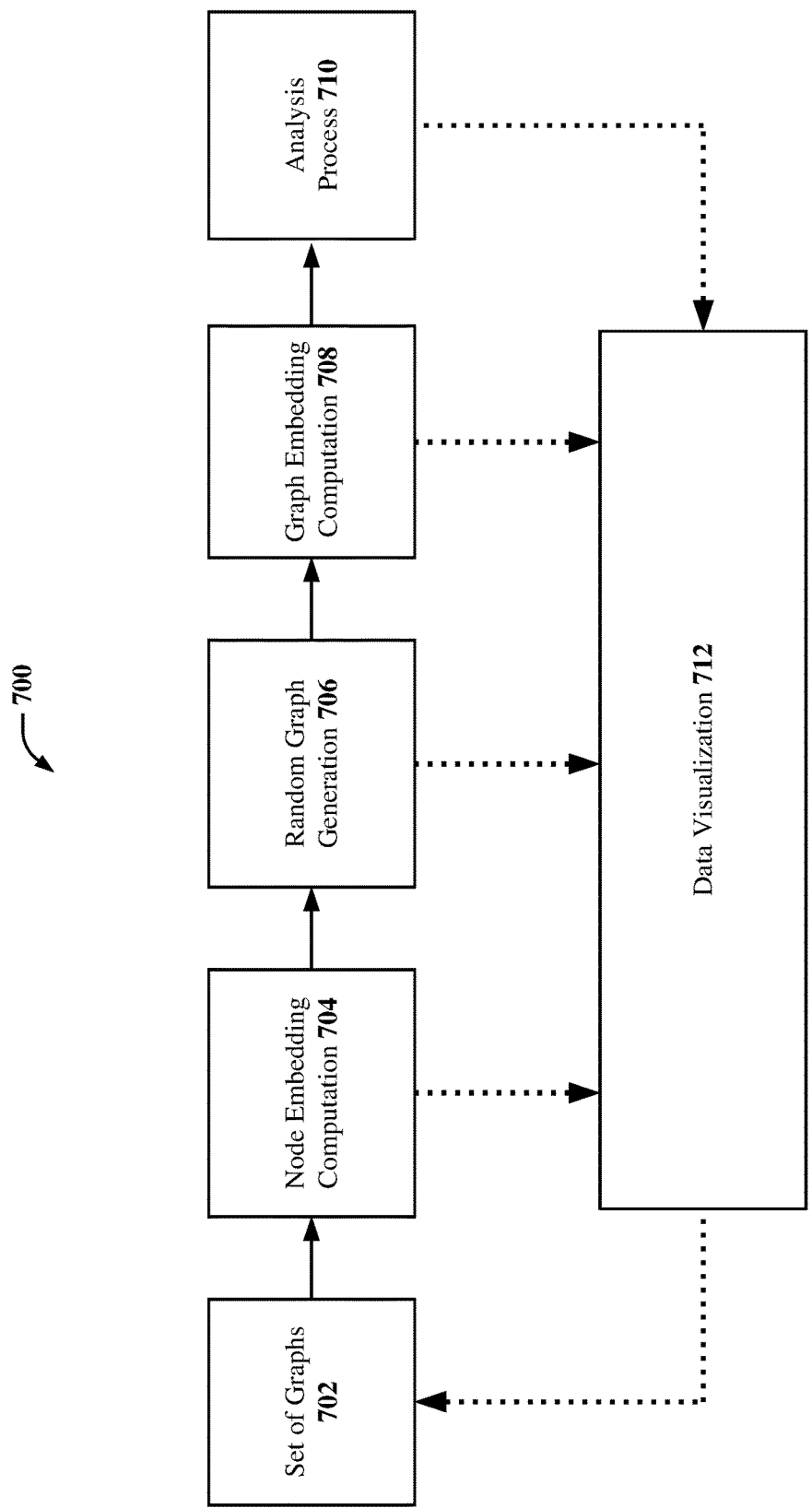
FIG. 7 illustrates a block diagram of an example, non-limiting system that facilitates random graph embedding components in accordance with one or more embodiments described herein.

FIG. 7 illustrates a block diagram of an example, non-limiting system 700 that facilitates random graph embedding components in accordance with one or more embodiments described herein. Repetitive description of like elements employed in respective embodiments is omitted for sake of brevity.

In some embodiments, system 700 can comprise a set of graphs 702, which can comprise one or more data graphs. For example, set of graphs 702 can comprise one or more data graphs 114.

In some embodiments, set of graphs 702 can be provided as inputs to facilitate execution of a node embedding computation 704. For example, node embedding component 502 can compute node embedding computation 704 (e.g., as described above with reference to FIG. 5) to generate geometric node embeddings based on one or more data graphs 114 of set of graphs 702.

In some embodiments, the geometric node embeddings computed by node embedding computation 704 (e.g., via node embedding component 502) can be provided as inputs to facilitate execution of random graph generation 706. For example, random graph component 108 can execute random graph generation 706 (e.g., as described above with reference to FIG. 1) based on such geometric node embeddings to generate one or more random graphs (e.g., random graphs 202).

In some embodiments, the one or more random graphs (e.g., random graphs 202) generated by random graph generation 706 (e.g., via random graph component 108) can be provided as inputs to facilitate execution of graph embedding computation 708. For example, graph embedding component 110 can execute graph embedding computation 708 (e.g., as described above with reference to FIG. 1) based on such one or more random graphs (e.g., random graphs 202) and/or one or more raw graphs (e.g., raw graphs 204) to generate one or more graph feature matrix (e.g., graph feature matrix 116).

In some embodiments, an analysis process 710 can be performed based on the one or more graph feature matrix (e.g., graph feature matrix 116). In some embodiments, analysis process 710 can, for example, perform (e.g., via analysis component 602 as described above with reference to FIG. 6) task-dependent analysis of set of graphs 702 based on graph embedding computation 708 (e.g., based on graph feature matrix 116). For example, analysis process 710 can perform (e.g., via analysis component 602) classification of set of graphs 702 based on graph embedding computation 708 (e.g., based on graph feature matrix 116). In another example, analysis process 710 can determine (e.g., via analysis component 602) one or more predictions associated with set of graphs 702 based on graph embedding computation 708 (e.g., based on graph feature matrix 116). In yet another example, analysis process 710 can perform (e.g., via analysis component 602) anomaly detection associated with set of graphs 702 based on graph embedding computation 708 (e.g., based on graph feature matrix 116). In yet another example, analysis process 710 can perform (e.g., via analysis component 602) spatial-temporal analysis of set of graphs 702 based on graph embedding computation 708 (e.g., based on graph feature matrix 116). In yet another example, analysis process 710 can perform (e.g., via analysis component 602) graph pattern matching and/or graph pattern searching of set of graphs 702 based on graph embedding computation 708 (e.g., based on graph feature matrix 116). In an embodiment, analysis process 710 can perform (e.g., via analysis component 602 and/or machine learning component 606 as described above with reference to FIG. 6) one or more machine learning processes to analyze set of graphs 702 based on graph embedding computation 708 (e.g., based on graph feature matrix 116).

In certain embodiments, data visualization 712 can provide visual data associated with set of graphs 702. For example, data visualization 712 can provide (e.g., via visualization component 504 as described above with reference to FIG. 5) spatial-temporal network diagnosis of set of graphs 702. Additionally or alternatively, data visualization 712 can provide (e.g., via visualization component 504) human readable interpretation of information associated with set of graphs 702. In an embodiment, data visualization 712 can provide (e.g., via visualization component 504) visual data (e.g., visual data 506 as described above with reference to FIG. 5) associated with node embedding computation 704. In another embodiment, data visualization 712 can provide (e.g., via visualization component 504) visual data (e.g., visual data 506) associated with random graph generation 706. In yet another embodiment, data visualization 712 can provide visual data (e.g., visual data 506) associated with graph embedding computation 708. In yet another embodiment, data visualization 712 can provide visual data (e.g., visual data 506) associated with analysis process 710.

In some embodiments, data visualization 712 can facilitate (e.g., via visualization component 504 and/or a graphical user interface (GUI) as described above with reference to FIG. 5) obtaining entity feedback indicative of real-time entity feedback associated with set of graphs 702, node embedding computation 704, random graph generation 706, graph embedding computation 708, and/or analysis process 710. In some embodiments, set of graphs 702 and/or analysis process 710 can be modified based on the user data.

Figure 8:
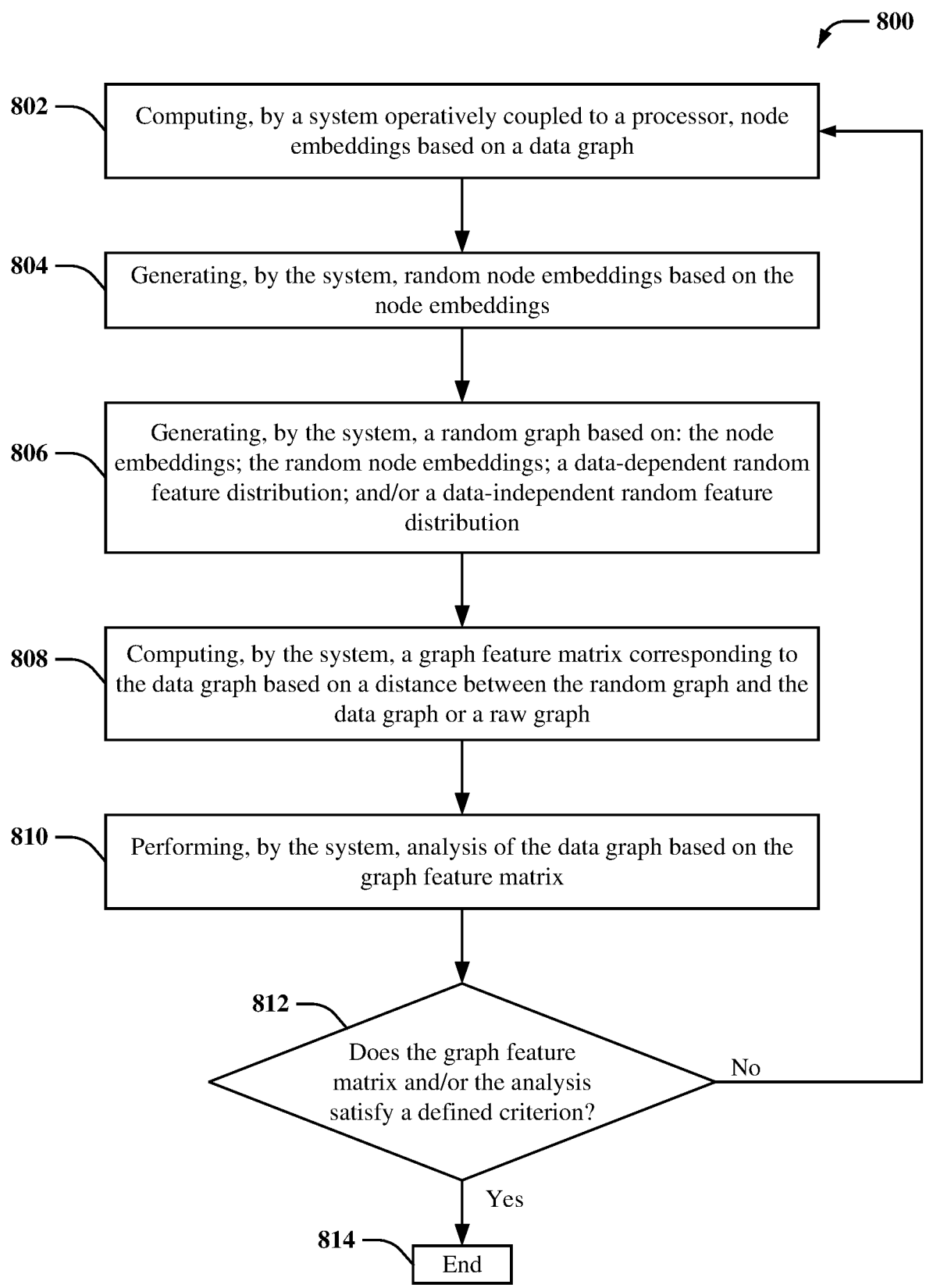
FIG. 8 illustrates a flow diagram of an example, non-limiting computer-implemented method that facilitates random graph embedding components in accordance with one or more embodiments described herein.

FIG. 8 illustrates a flow diagram of an example, non-limiting computer-implemented method 800 that facilitates random graph embedding components in accordance with one or more embodiments described herein. Repetitive description of like elements employed in respective embodiments is omitted for sake of brevity.

At 802, computing, by a system (e.g., random graph embedding system 102 and/or node embedding component 502) operatively coupled to a processor (e.g., processor 106), node embeddings (e.g., node embeddings $U=\{u_i\}_{i=1}^n$ of algorithm 400) based on a data graph (e.g., data graph 114).

At 804, generating, by the system (e.g., random graph embedding system 102 and/or random graph component 108), random node embeddings (e.g., random graph node embeddings generated by random graph component 108 as described above with reference to FIG. 1) based on the node embeddings.

At 806, generating, by the system (e.g., via random graph embedding system 102 and/or random graph component 108), a random graph (e.g., random graph 202) based on: the node embeddings; the random node embeddings; a data-dependent random feature distribution (e.g., RGE(RF)); and/or a data-independent random feature distribution (e.g., RGE(ASG)).

At 808, computing, by the system (e.g., via random graph embedding system 102 and/or graph embedding component 110), a graph feature matrix (e.g., graph feature matrix 116) corresponding to the data graph based on a distance (e.g., a dissimilarity measurement, EMD, etc.) between the random graph and the data graph or a raw graph (e.g., raw graph 204).

At 810, performing, by the system (e.g., via random graph embedding system 102, analysis component 602, and/or machine learning component 606), analysis of the data graph based on the graph feature matrix. In some embodiments, the system (e.g., via random graph embedding system 102 and/or analysis component 602), can perform analysis of the data graph to generate analysis data 604 (e.g., as described above with reference to FIG. 6). In some embodiments, the system (e.g., via random graph embedding system 102 and/or analysis component 602) can perform analysis of the data graph, where such analysis can be indicative of a machine learning process to generate analysis data 604 (e.g., as described above with reference to FIG. 6).

At 810, it can be determined whether the graph feature matrix (e.g., graph feature matrix 116) and/or the analysis (e.g., analysis data 604) satisfies a defined criterion. If no, the computer-implemented method 800 returns to 802. If yes, the computer-implemented method 800 ends.

In some embodiments, computer-implemented method 800 can comprise executing, by the system (e.g., via random graph embedding system 102, random graph component 108, graph embedding component 110, node embedding component 502, analysis component 602, and/or machine learning component 606), a scalable graph mining operation and/or a multi-task graph mining operation (e.g., a PD global graph kernel operation as described above with reference to FIGS. 1-6). In some embodiments, computer-implemented method 800 can comprise generating, by the system (e.g., via random graph embedding system 102 and/or visualization component 504), visual data (e.g., visual data 506) based on feedback from an entity (e.g., real-time feedback input to random graph embedding system 102 by a human user via a GUI), the visual data that can comprise data indicative of quality of: the random graph; the node embeddings; the random graph node embeddings; the graph feature matrix; and/or the analysis.

Figure 9:
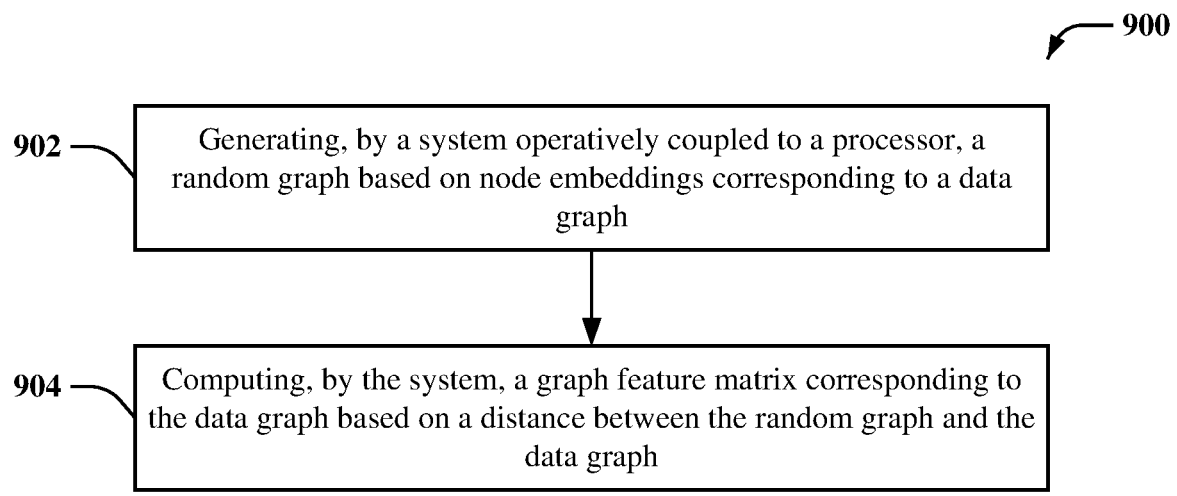
FIG. 9 illustrates a flow diagram of an example, non-limiting computer-implemented method that facilitates random graph embedding components in accordance with one or more embodiments described herein.

FIG. 9 illustrates a flow diagram of an example, non-limiting computer-implemented method 900 that facilitates random graph embedding components in accordance with one or more embodiments described herein. Repetitive description of like elements employed in respective embodiments is omitted for sake of brevity.

At 902, generating, by a system (e.g., via random graph embedding system 102, random graph component 108, and/or node embedding component 502) operatively coupled to a processor (e.g., processor 106), a random graph (e.g., random graph 202) based on node embeddings (e.g., node embeddings $U=\{u_i\}_{i=1}^n$ of algorithm 400) corresponding to a data graph (e.g., data graph 114).

At 904, computing, by the system (e.g., via random graph embedding system 102 and/or graph embedding component 110), a graph feature matrix (e.g., graph feature matrix 116) corresponding to the data graph based on a distance (e.g., a dissimilarity measurement, EMD, etc.) between the random graph and the data graph (or a raw graph such as, for example, raw graph 204).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
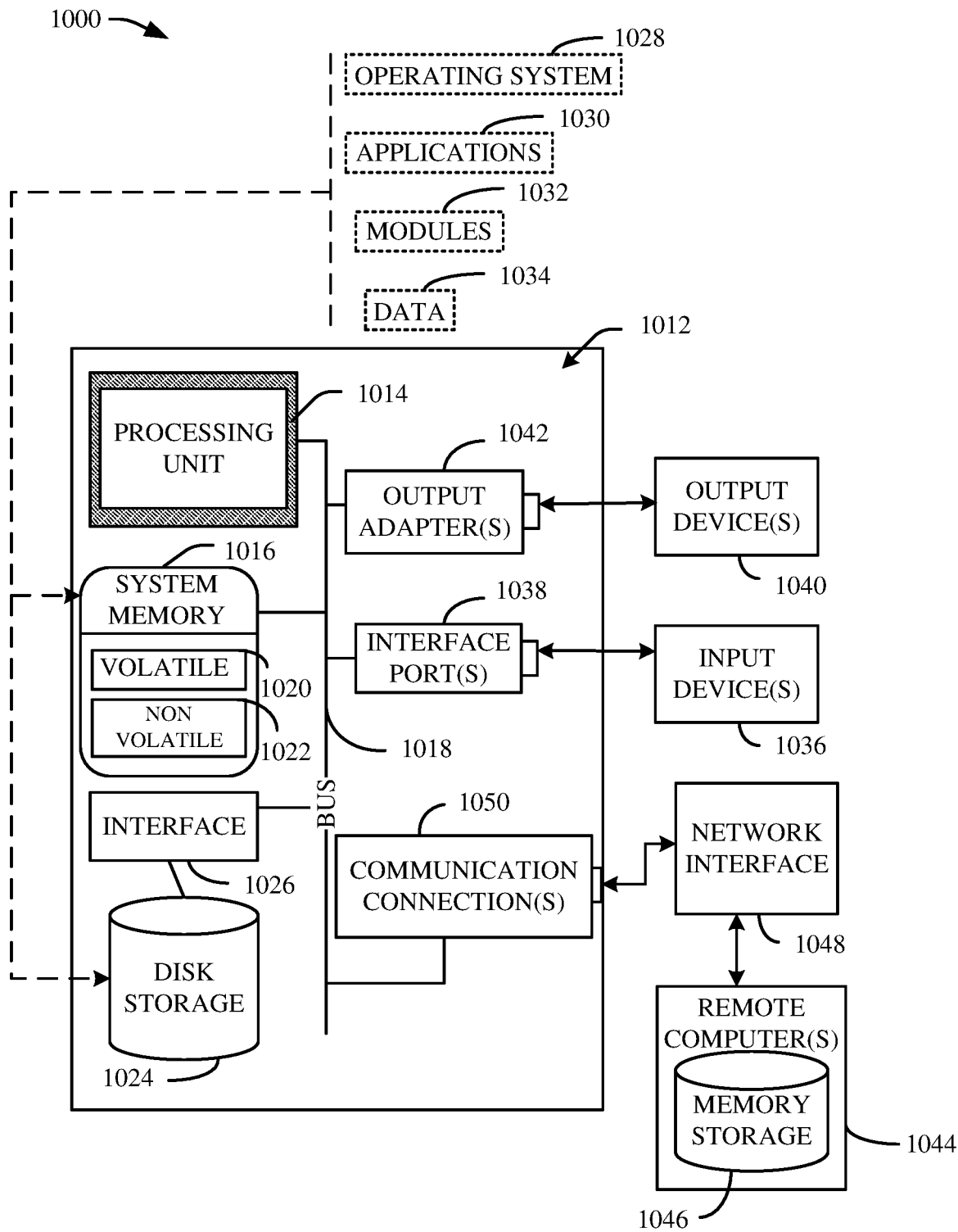
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
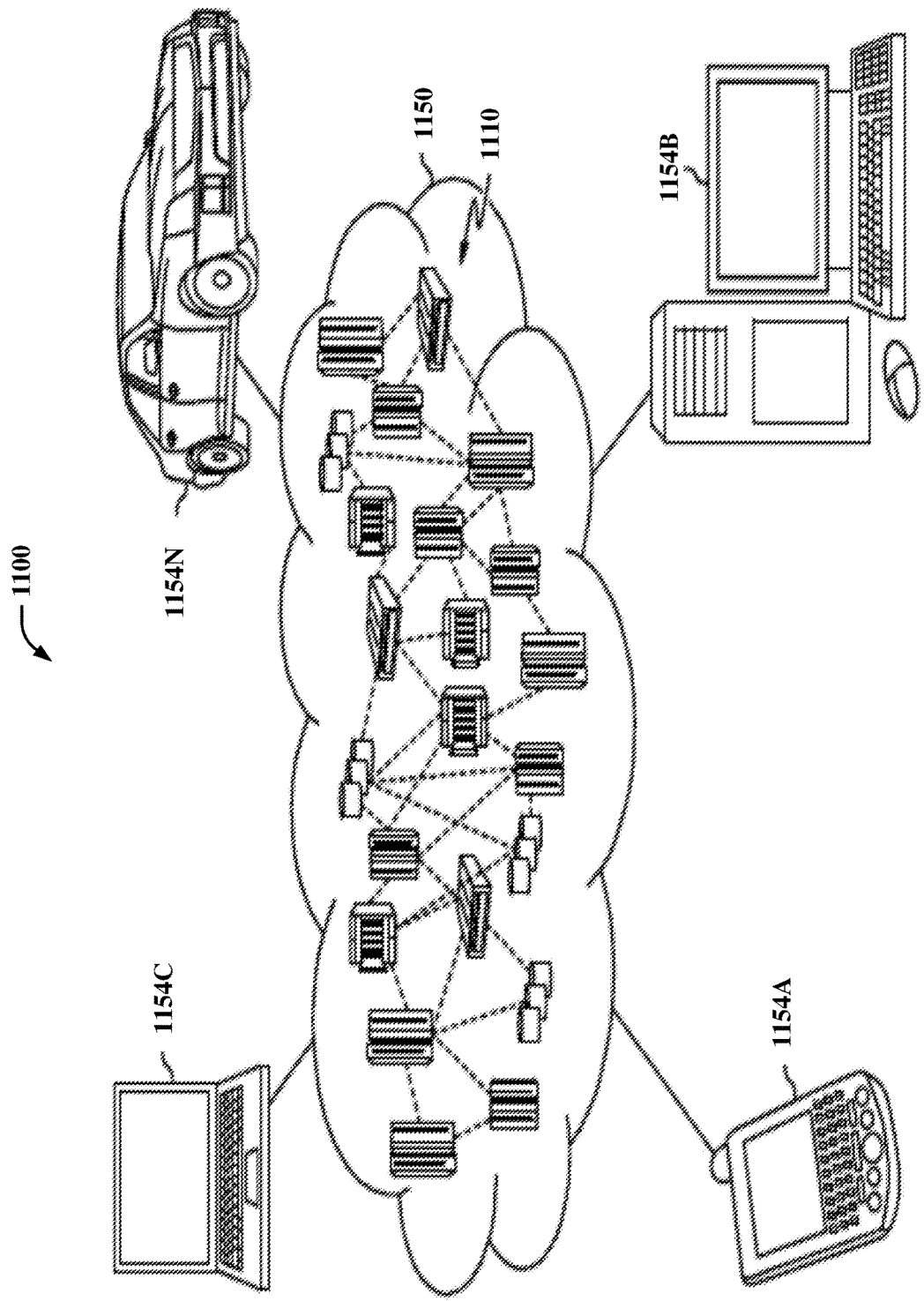
FIG. 11 illustrates a block diagram of an example, non-limiting cloud computing environment in accordance with one or more embodiments of the subject disclosure.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
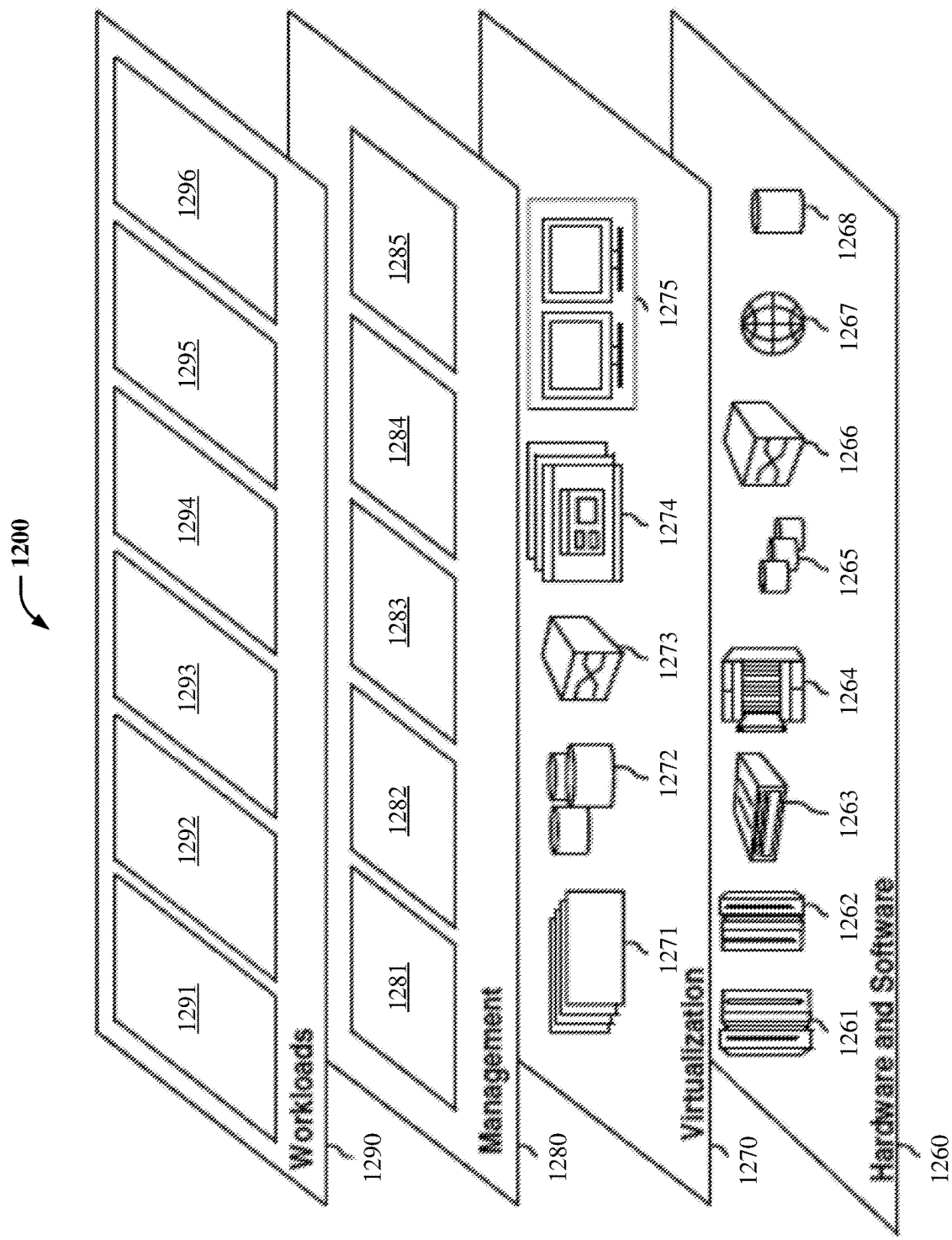
FIG. 12 illustrates a block diagram of example, non-limiting abstraction model layers in accordance with one or more embodiments of the subject disclosure.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and random graph embedding software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   a random graph component that generates a random graph wherein properties of the random graph are determined randomly based on first node embeddings corresponding to a data graph, an embedding is a representation of a respective graph on a surface of a dimensional space, and the first node embeddings comprise a first bag of vectors; and
   a graph embedding component that computes a graph feature matrix corresponding to the data graph based on a distance between a second bag of vectors of second node embeddings representing the random graph and the first bag of vectors of the first node embeddings representing the data graph, wherein the graph feature matrix comprises a positive-definite global graph kernel matrix being a symmetric matrix with all positive eigenvalues and containing global properties of the data graph, and analyzes the data graph based on the graph feature matrix, thereby facilitates at least one of reduced memory consumption associated with the memory, or improved processing efficiency associated with the processor.

2. The system of claim 1, wherein the computer executable components further comprise a node embedding component that computes the first node embeddings based on the data graph.

3. The system of claim 1, wherein the random graph component generates the random graph based on random graph node embeddings computed by the random graph component.

4. The system of claim 1, wherein the random graph component generates the random graph based on a data-dependent random feature distribution or a data-independent random feature distribution.

5. The system of claim 1, wherein the distance is based on a dissimilarity measurement between the first bag of vectors and the second bag of vectors.

6. The system of claim 1, wherein the computer executable components further comprise a visualization component that generates visual data based on feedback from an entity, the visual data comprising data indicative of quality of at least one of:
the random graph;
the first node embeddings;
the second node embeddings; or
the graph feature matrix.

7. The system of claim 1, wherein the computer executable components further comprise an analysis component that employs the graph feature matrix to perform analysis of the data graph.

8. A computer-implemented method, comprising:
generating, by a system operatively coupled to a processor and a memory, a random graph, wherein properties of the random graph are determined randomly based on first node embeddings corresponding to a data graph, an embedding is a representation of a respective graph on a surface of a dimensional space, and the first node embeddings comprise a first bag of vectors; and
computing, by the system, a graph feature matrix corresponding to the data graph based on a distance between a second bag of vectors of second node embeddings representing the random graph and the first bag of vectors of the first node embeddings representing the data graph, wherein the graph feature matrix comprises a positive-definite global graph kernel matrix being a symmetric matrix with all positive eigenvalues and containing global properties of the data graph; and
analyzing, by the system, the data graph based on the graph feature matrix, thereby facilitating at least one of reduced memory consumption associated with the memory, or improved processing efficiency associated with the processor.

9. The computer-implemented method of claim 8, further comprising computing, by the system, the first node embeddings based on the data graph.

10. The computer-implemented method of claim 8, wherein the generating further comprises, generating, by the system, the random graph based on random graph node embeddings.

11. The computer-implemented method of claim 8, wherein the generating further comprises, generating, by the system, the random graph based on a data-dependent random feature distribution or a data-independent random feature distribution.

12. The computer-implemented method of claim 8, wherein the distance is based on a dissimilarity measurement between the first bag of vectors and the second bag of vectors.

13. The computer-implemented method of claim 8, further comprising, generating, by the system, visual data based on feedback from an entity, the visual data comprising data indicative of quality of at least one of:
the random graph;
the first node embeddings;
the second node embeddings; or
the graph feature matrix.

14. The computer-implemented method of claim 8, further comprising executing, by the system, at least one of:
a scalable graph mining operation; or a
multi-task graph mining operation.

15. A computer program product facilitating graph similarity analytics, the computer program product comprising a computer readable storage medium having program instructions embodied therewith, the program instructions executable by a system comprising a processor coupled to a memory to cause the system to:
generate, by the system, a random graph, wherein properties of the random graph are determined randomly based on first node embeddings corresponding to a data graph, an embedding is a representation of a respective graph on a surface of a dimensional space, and, and the first node embeddings comprise a first bag of vectors;
compute, by the system, a graph feature matrix corresponding to the data graph based on a distance between a second bag of vectors of second node embeddings representing the random graph and the first bag of vectors of the first node embeddings representing the data graph, wherein the graph feature matrix comprises a positive-definite global graph kernel matrix being a symmetric matrix with all positive eigenvalues and containing global properties of the data graph; and
analyzing, by the system, the data graph based on the graph feature matrix, thereby facilitating at least one of reduced memory consumption associated with the memory, or improved processing efficiency associated with the processor.

16. The computer program product of claim 15, wherein the program instructions are further executable by the processor to cause the processor to compute, by the processor, the first node embeddings based on the data graph.

17. The computer program product of claim 15, wherein the program instructions are further executable by the processor to cause the processor to generate, by the processor, visual data based on feedback from an entity, the visual data comprising data indicative of quality of at least one of:
the random graph;
the first node embeddings;
the second node embeddings; or
the graph feature matrix.

18. The computer program product of claim 15, wherein the program instructions are further executable by the processor to cause the processor to perform, by the processor, analysis of the data graph based on the graph feature matrix.

\* \* \* \* \*